United States Patent [19]
Hattori

[11] Patent Number: 5,960,203
[45] Date of Patent: Sep. 28, 1999

[54] ASSEMBLER DEVICE AND ITS ASSEMBLING METHOD FOR USE IN A MICROCOMPUTER OR OTHER COMPUTER SYSTEM

[75] Inventor: Naoki Hattori, Kanagawa, Japan

[73] Assignee: NEC Corporation, Tokyo, Japan

[21] Appl. No.: 08/838,264

[22] Filed: Apr. 17, 1997

[30] Foreign Application Priority Data

Apr. 25, 1996 [JP] Japan .................................. 8-105488

[51] Int. Cl.[6] .................................................. G06F 9/45
[52] U.S. Cl. ........................ 395/709; 395/704; 395/705; 395/708; 364/148
[58] Field of Search .............................. 395/183.11, 700, 395/705, 703, 709, 708, 706, 704, 702; 364/280, 148, 768

[56] References Cited

U.S. PATENT DOCUMENTS

| | | | |
|---|---|---|---|
| 4,398,249 | 8/1983 | Pardo et al. ............................ | 395/705 |
| 4,763,255 | 8/1988 | Hopkins et al. ........................ | 395/709 |
| 5,182,807 | 1/1993 | Mizuse et al. ........................... | 395/703 |
| 5,263,162 | 11/1993 | Lundeby .................................. | 395/709 |
| 5,437,034 | 7/1995 | Tanaka et al. .......................... | 395/706 |
| 5,655,122 | 8/1997 | Wu ......................................... | 395/705 |
| 5,742,828 | 4/1998 | Canady et al. .......................... | 395/708 |
| 5,836,014 | 11/1998 | Faiman, Jr. ............................. | 395/707 |

FOREIGN PATENT DOCUMENTS

| | | |
|---|---|---|
| 64-68836 | 3/1989 | Japan . |
| 5-127916 | 5/1993 | Japan . |
| 5-165650 | 7/1993 | Japan . |
| 5-257703 | 10/1993 | Japan . |
| 0825531A1 | 2/1998 | United Kingdom .............. G06F 9/45 |

OTHER PUBLICATIONS

"622 Mb/s 8 × 8 Shared Multibuffer ATM Switch with Hierarchical Queueing and Multicast Functions", Proceedings of the Global Telecommunications Conference (GLOBECOM), Houston, (Nov. 29, 1993–Dec. 2, 1993), IEEE, vol. 3, Nov. 29, 1993, pp. 1488–1495.

Gross, "Object I/O and runtime type information via automatic code generation in C++", JOOP, pp. 34–42, Jul. 1993.

Patent Abstracts of Japan, vol. 97, No. 1, Jan. 21, 1997, JP 08 234998A.

Patent Abstracts of Japan, vol. 13, No. 284, Jun. 29, 1989, JP 01 068836A.

Patent Abstracts of Japan, vol. 17, No. 502, Sep. 9, 1993, JP 05 127916A.

Patent Abstracts of Japan, vol. 18, No. 24, Jan. 14, 1994, JP 05 257703A.

Patent Abstracts of Japan, vol. 12, No. 62, Feb. 25, 1988, JP 62 205431.

*Primary Examiner*—Tariq R. Hafiz
*Assistant Examiner*—Anil Khatri
*Attorney, Agent, or Firm*—Foley & Lardner

[57] ABSTRACT

An assembler device comprising a pass-1 processing executing unit for executing a pass-1 processing of generating a code optimization table and a code optimization information-attached symbol table including information at least on attribute and appearance frequency of a symbol appearing in an assembler program, and for estimating a code, a code optimizing unit of correcting the code optimization information-attached symbol table with reference to the code optimization table, and a pass-2 processing executing unit for executing a pass-2 processing of converting the assembler program into an object module file with reference to the corrected code optimization information-attached symbol table.

7 Claims, 16 Drawing Sheets

FIG. 8(A)

| NAME | VALUE | SEGMENT INFORMATION | OPTIMIZATION INFORMATION |
|---|---|---|---|
| name | val | attr | opt_val |
| sym1 | ? | ? | 0 |

| name | val | attr | opt_val |
|---|---|---|---|
| sym1 | ? | ? | 0 |
| sym2 | ? | ? | 1 |

| name | val | attr | opt_val |
|---|---|---|---|
| sym1 | ? | ? | 0 |
| sym2 | ? | ? | 1 |
| sym | ? | ? | 2 |

| name | val | attr | opt_val |
|---|---|---|---|
| sym1 | ? | ? | 0 |
| sym2 | ? | ? | 1 |
| sym | ? | ? | 2 |
| lab | CH | 0 | 3 |

| name | val | attr | opt_val |
|---|---|---|---|
| sym1 | ? | ? | 0 |
| sym2 | ? | ? | 1 |
| sym | ? | ? | 2 |
| lab | CH | 0 | 3 |
| lab2 | 12H | 0 | 4 |

| NAME | VALUE | SEGMENT INFORMATION | OPTIMIZATION INFORMATION |
|------|-------|---------------------|--------------------------|
| name | val | attr | opt_val |
| sym1 | 2H | 1 | 0 |
| sym2 | ? | ? | 1 |
| sym | 0H | 1 | 2 |
| lab | CH | 0 | 3 |
| lab2 | 12H | 0 | 4 |

FIG. 9(B)

| name | val | attr | opt_val |
|------|-----|------|---------|
| sym1 | 2H | 1 | 0 |
| sym2 | 0H | 2 | 1 |
| sym | 0H | 1 | 2 |
| lab | CH | 0 | 3 |
| lab2 | 12H | 0 | 4 |

FIG. 9(C)

| name | val | attr | opt_val |
|------|-----|------|---------|
| sym1 | 2H | 1 | 0 |
| sym2 | 0H | 2 | 1 |
| sym | 0H | 1 | 2 |
| lab | 9H | 0 | 3 |
| lab2 | 12H | 0 | 4 |

FIG. 9(D)

| name | val | attr | opt_val |
|------|-----|------|---------|
| sym1 | 2H | 1 | 0 |
| sym2 | 0H | 2 | 1 |
| sym | 0H | 1 | 2 |
| lab | 9H | 0 | 3 |
| lab2 | EH | 0 | 4 |

FIG. 12(A)
(PRIOR ART)

| NAME | VALUE | SEGMENT INFORMATION |
|---|---|---|
| name | val | attr |
| sym1 | ? | ? |

FIG. 12(B)
(PRIOR ART)

| name | val | attr |
|---|---|---|
| sym1 | ? | ? |
| sym2 | ? | ? |

FIG. 12(C)
(PRIOR ART)

| name | val | attr |
|---|---|---|
| sym1 | ? | ? |
| sym2 | ? | ? |
| sym | ? | ? |

FIG. 12(D)
(PRIOR ART)

| name | val | attr |
|---|---|---|
| sym1 | ? | ? |
| sym2 | ? | ? |
| sym | ? | ? |
| lab | CH | 0 |

FIG. 12(E)
(PRIOR ART)

| NAME | VALUE | SEGMENT INFORMATION |
|---|---|---|
| name | val | attr |
| sym1 | ? | ? |
| sym2 | ? | ? |
| sym | ? | ? |
| lab | CH | 0 |
| lab2 | 12H | 0 |

FIG. 12(F)
(PRIOR ART)

| name | val | attr |
|---|---|---|
| sym1 | 2H | 1 |
| sym2 | ? | ? |
| sym | 0H | 1 |
| lab | CH | 0 |
| lab2 | 12H | 0 |

FIG. 12(G)
(PRIOR ART)

| name | val | attr |
|---|---|---|
| sym1 | 2H | 1 |
| sym2 | 0H | 2 |
| sym | 0H | 1 |
| lab | CH | 0 |
| lab2 | 12H | 0 |

FIG. 13
(PRIOR ART)

```
c1      cseg
        mov     a, sym1     ······(1)
        add     a, sym2     ······(2)
        xch     a, sym1     ······(3)
        mov     a, sym      ······(4)
lab:                        ··········(5)
        mov     a, sym1     ······(6)
        xch     a, sym2     ······(7)
lab2:                       ··········(8)
        ret
d1      dseg    saddr2      ······(12)
sym:    ds      2           ········(9)
sym1:   ds      2           ········(10)
d2      dseg    saddr       ······(13)
sym2:   ds      2           ········(11)
        end
```

FIG. 14
(PRIOR ART)

| NO | ADDR | OBJECT | | | |
|----|------|--------|------|------|------|
| 1  | ------ |       | c1   | cseg |      |
| 2  | 000000 | 200200 |    | mov  | a, sym1 | ····(21) |
| 3  | 000003 | 781100 |    | add  | a, sym2 |
| 4  | 000006 | 210200 |    | xch  | a, sym1 | ····(22) |
| 5  | 000009 | 200000 |    | mov  | a, sym  | ····(23) |
| 6  |        |        |    | ······NOP |
| 7  | 00000C |        | lab: |      |      |
| 8  | 00000C | 200200 |    | mov  | a, sym1 | ····(24) |
| 9  | 00000F | 391100 |    | xch  | a, sym2 |
| 10 | 000012 |        | lab2: |     |      |
| 11 | 000012 | 56     |    | ret  |      |
| 12 |        |        |    |      |      |
| 13 | ------ |        | d1   | dseg | saddr2 |
| 14 | 000000 |        | sym: | ds   | 2    |
| 15 | 000002 |        | sym1: | ds  | 2    |
| 16 |        |        |    |      |      |
| 17 | ------ |        | d2   | dseg | saddr |
| 18 | 000000 |        | sym2: | ds  | 2    |
| 19 |        |        |    | end  |      |

FIG. 16(A)
(PRIOR ART)

| NAME | VALUE | SEGMENT INFORMATION |
|------|-------|---------------------|
| name | val | attr |
| sym1 | ? | ? |

FIG. 16(B)
(PRIOR ART)

| name | val | attr |
|------|-----|------|
| sym1 | ? | ? |
| sym2 | ? | ? |

FIG. 16(C)
(PRIOR ART)

| name | val | attr |
|------|-----|------|
| sym1 | ? | ? |
| sym2 | ? | ? |
| sym | ? | ? |

FIG. 16(D)
(PRIOR ART)

| name | val | attr |
|------|-----|------|
| sym1 | ? | ? |
| sym2 | ? | ? |
| sym | ? | ? |
| lab | ? | 0 |

FIG. 16(E)
(PRIOR ART)

| name | val | attr |
|------|-----|------|
| sym1 | ? | ? |
| sym2 | ? | ? |
| sym | ? | ? |
| lab | ? | 0 |
| lab2 | ? | 0 |

FIG. 16(F)
(PRIOR ART)

| NAME | VALUE | SEGMENT INFORMATION |
|------|-------|---------------------|
| name | val | attr |
| sym1 | 2H | 1 |
| sym2 | ? | ? |
| sym | 0H | 1 |
| lab | ? | 0 |
| lab2 | ? | 0 |

FIG. 16(G)
(PRIOR ART)

| name | val | attr |
|------|-----|------|
| sym1 | 2H | 1 |
| sym2 | 0H | 2 |
| sym | 0H | 1 |
| lab | ? | 0 |
| lab2 | ? | 0 |

FIG. 16(H)
(PRIOR ART)

| name | val | attr |
|------|-----|------|
| sym1 | 2H | 1 |
| sym2 | 0H | 2 |
| sym | 0H | 1 |
| lab | 9H | 0 |
| lab2 | 7 | 0 |

FIG. 16(I)
(PRIOR ART)

| name | val | attr |
|------|-----|------|
| sym1 | 2H | 1 |
| sym2 | 0H | 2 |
| sym | 0H | 1 |
| lab | 9H | 0 |
| lab2 | EH | 0 |

FIG. 17
(PRIOR ART)

| NO | ADDR | OBJECT | | | |
|----|------|--------|---|---|---|
| 1  | ------ |      | c1   | cseg |   |
| 2  | 000000 | 2002 |      | mov  | a, sym1 · · · · (31) |
| 3  | 000002 | 781100 |    | add  | a, sym2 |
| 4  | 000005 | 2102 |      | xch  | a, sym1 · · · · (32) |
| 5  | 000007 | 2000 |      | mov  | a, sym · · · · (33) |
| 6  |        |      |      |      |   |
| 7  | 000009 |      | lab: |      |   |
| 8  | 000009 | 2002 |      | mov  | a, sym1 · · · · (34) |
| 9  | 00000B | 391100 |    | xch  | a, sym2 |
| 10 | 00000E |      | lab2: |     |   |
| 11 | 00000E | 56   |      | ret  |   |
| 12 |        |      |      |      |   |
| 13 | ------ |      | d1   | dseg | saddr2 |
| 14 | 000000 |      | sym: | ds   | 2 |
| 15 | 000002 |      | sym1: | ds  | 2 |
| 16 |        |      |      |      |   |
| 17 | ------ |      | d2   | dseg | saddr |
| 18 | 000000 |      | sym2: | ds  | 2 |
| 19 |        |      |      | end  |   |

ASSEMBLER DEVICE AND ITS ASSEMBLING METHOD FOR USE IN A MICROCOMPUTER OR OTHER COMPUTER SYSTEM

BACKGROUND OF THE INVENTION

1. Field of the Invention

The present invention relates to an assembler device and its assembling method for use in a microcomputer or other computer system, and particularly to an assembling system capable of generating an optimum object code of a small-sized program without increasing frequency of pass.

2. Description of the Related Art

As a conventional assembler device of this kind, there have been a device for assembling according to two-pass method having two passes, each pass including one execution of processing through reading an input assembler program from the head to the end by one line, and another device for assembling according to three-pass method having three passes like that.

FIG. 11 is a block diagram showing the constitution of the system in the conventional assembler device of two-pass method. The assembler device shown in FIG. 11 comprises a control section 1100 including a pass-1 processing executing unit 1110 for executing a pass-1 processing and a pass-2 processing executing unit 1120 for executing a pass-2 processing, and an auxiliary storage section 1200 for storing an assembler program 1201, a symbol table 1202 and an object module file 1203. The pass-1 processing executing unit 1110 in the control section 1100 includes a character analyzing unit 1111, a syntax analyzing unit 1112, a symbol table generating unit 1113, and a code estimating unit 1114. The pass-2 processing executing unit 1120 includes a character analyzing unit 1121, a syntax analyzing unit 1122, and a codes generating unit 1123.

Each function of each component will be described. In the pass-1 processing executing unit 1110, the character analyzing unit 1111 breaks an assembler program 1201 read from the auxiliary storage section 1200 into characters and analyzes them. The syntax analyzing unit 1112 builds syntax upon receipt of the result of the character analysis by the character analyzing unit 1111 and recognizes the syntax. The symbol table generating unit 1113 generates a symbol table 1202 upon receipt of the result of the syntax analysis by the syntax analyzing unit 1112. The code estimating unit 1114 estimates an object code upon receipt of the result of the syntax analysis by the syntax analyzing unit 1112.

This time, in the pass-2 processing executing unit 1120, the character analyzing unit 1121 breaks an assembler program 1201 read from the auxiliary storage section 1200 into characters and analyzes them. The syntax analyzing unit 1122 builds syntax upon receipt of the result of the character analysis by the character analyzing unit 1121 and recognizes the syntax. The code generating unit 1123 generates an object code for the syntax built by the syntax analyzing unit 1122 and stores it into the auxiliary storage section 1200 as an object module file 1203.

A concrete example of the object module file generated by the conventional assembler device of two-pass method having the above-mentioned structure will be described with reference to FIGS. 12 to 14.

A table shown in FIG. 13 is an example of the assembler program to be processed. In the assembler program of FIG. 13, the instructions A(1), B(2), C(3), D(4), E(6), and F(7) are statements respectively describing that a symbol of the data segment (DSEG) is referred to. The attribute of the data segment decides whether each instruction is two bytes long or three bytes long.

The segment definition A(12) is a specification statement describing that the definition of the data area visible by the two-byte instruction starts. The Labels C(9) and D(10) described after this segment definition A(12) is defined are visible by the two-byte instruction. The segment definition B(13) is a specification statement describing that the definition of the data area visible by the three-byte instruction starts. The Label E(11) described after the definition of the segment definition B(13) is visible by the three-byte instruction.

FIG. 12 is a view showing the process of generating a symbol table 1202 by the symbol table generating unit 1113 according to the operation of this conventional example. The symbol table 1202 of FIG. 12(A) shows the state after the instruction A(1) of the assembler program of FIG. 13 has been processed. At this point, it is impossible to confirm whether the "sym1" is visible by the two-byte instruction or by the three-byte instruction, so that the "sym1" is regarded as visible by the three-byte instruction. The instructions B(2), C(3), and D(4) are similarly processed and any "sym" is regarded as visible by the three-byte instruction. FIG. 12(C) is the symbol table 1202 generated at the result of the above-mentioned processing.

The symbol table 1202 of FIG. 12(D) shows the state after the Label A(5) has been processed. Since all the instructions A(1), B(2), C(3), and D(4) have been regarded as the three-byte instructions, the value of the Label A(5) becomes "CH". Also, the instructions E(6) and F(7) are regarded as the three-byte instructions.

The symbol table 1202 of FIG. 12(E) shows the state after the Label B(8) has been processed. Since the instructions E(6) and F(7) have been judged to be the three-byte instructions, the value of the Label B(8) becomes "12H". The symbol table 1202 of FIG. 12(F) shows the state after the Labels C(9) and D(10) have been processed. Both the Labels C(9) and D(10) are Labels defined in the data area visible by the two-byte instruction. The symbol table 1202 of FIG. 12(G) shows the state after the Label E(11) has been processed. The Label E(11) is a Label defined in the data area visible by the three-byte instruction. Thus, the pass-1 processing has been completed.

This time, in the pass-2 processing, the code generating unit 1123 generates an object module file 1203 on the basis of the information stored in the symbol table 1202 which has been decided through the pass-1 processing. FIG. 14 is an assembly listing generated by processing the assembler program of FIG. 13.

In the assembly listing of FIG. 14, the generation instructions E(21), F(22), G(23), and H(24) are all generated by the three-byte instruction, in spite of their reference to the Labels all defined in the data area visible by the two-byte instruction in fact. Therefore, useless object codes of four bytes in total are generated.

The assembler device of three-pass method will be described this time. As this kind of the conventional technique, there has been an assembler device, for example, disclosed in Japanese Patent Publication Laid-Open (Kokai) No. Heisei 5-257703, "An Assembler Device". FIG. 15 is a block diagram showing the constitution of the system in the assembler device of three-pass method disclosed in the same publication.

The assembler device shown in FIG. 15 comprises a control section 1300 including a pass-1 processing executing unit 1310 for executing a pass-1 processing, a pass-2 processing executing unit 1320 for executing a pass-2 processing, and a pass-3 processing executing unit 1330 for executing a pass-3 processing, and an auxiliary storage section 1200 for storing an assembler program 1201, a symbol table 1202, and an object module file 1203. The pass-1 processing executing unit 1310 in the control section 1300 includes a character analyzing unit 1311, a syntax analyzing unit 1312, and a symbol table generating unit 1313. The pass-2 processing executing unit 1320 includes a character analyzing unit 1321, a syntax analyzing unit 1322, a symbol table generating unit 1323, and a code estimating unit 1324. The pass-3 processing executing unit 1330 includes a character analyzing unit 1331, a syntax analyzing unit 1332, and a code generating unit 1333.

Each function of each component will be described. In the pass-1 processing executing unit 1310, the character analyzing unit 1311 breaks an assembler program 1201 read from the auxiliary storage section 1200 into characters and analyzes them. The syntax analyzing unit 1312 builds syntax upon receipt of the result of the character analysis by the character analyzing unit 1311 and recognizes the syntax. The symbol table generating unit 1313 generates a symbol table 1202 upon receipt of the result of the syntax analysis by the syntax analyzing unit 1312.

This time, in the pass-2 processing executing unit 1320, the character analyzing unit 1321 breaks the assembler program 1201 read from the auxiliary storage section 1200 into characters and analyzes them. The syntax analyzing unit 1322 builds syntax upon receipt of the result of the character analysis by the character analyzing unit 1321 and recognizes the syntax. The symbol table generating unit 1323 corrects the symbol table 1202 generated by the symbol table generating unit 1313 of the pass-1 processing executing unit 1310, upon receipt of the result of the syntax analysis by the syntax analyzing unit 1322. The code estimating unit 1324 estimates an object code upon receipt of the syntax analysis by the syntax analyzing unit 1322.

In the pass-3 processing executing unit 1330, the character analyzing unit 1331 breaks the assembler program 1201 read from the auxiliary storage section 1200 into characters and analyzes them. The syntax analyzing unit 1332 builds syntax upon receipt of the result of the character analysis by the character analyzing unit 1331 and recognizes the syntax. The code generating unit 1333 generates an object code for the syntax built by the syntax analyzing unit 1332 and stores it into the auxiliary storage section 1200 as an object module file 1203.

A concrete example of the object module file generated by the conventional assembler device of three-pass method having the above-mentioned structure will be described with reference to FIGS. 16 and 17. Also in this example, the assembler program shown in FIG. 13 is used as a candidate for processing.

FIG. 16 is a view showing the process of generating a symbol table 1202 by the symbol table generating unit 1313 according to the operation of the conventional example. The symbol table 1202 of FIG. 16(A) shows the state after the instruction A(1) of the assembler program of FIG. 13 has been processed. Since it is impossible to confirm at this point whether the "sym1" is visible by the two-byte instruction or by the three-byte instruction, only the name "sym1" is registered in the symbol table 1202. The instructions B(2), C(3), and D(4) are similarly processed and in any case, only the "name" is registered in the symbol table 1202. FIG. 16(C) is the symbol table 1202 generated at the result of the above-mentioned processing.

The symbol table 1202 of FIG. 16(D) shows the state after the Label A(5) has been processed. At this time, the name "lab" and the segment information "0" are registered in the symbol table 1202. Since it is impossible to confirm whether the instructions E(6) and F(7) are visible by the two-byte instruction or by the three-byte instruction, each name only is registered in the symbol table 1202.

The symbol table 1202 of FIG. 16(E) shows the state after the Label B(8) has been processed. At this time, the name "lab2" and the segment information "0" are registered in the symbol table 1202. The symbol table 1202 of FIG. 16(F) shows the state after the Labels C(9) and D(10) have been processed. Both the Labels C(9) and D(10) are Labels defined in the data area visible by the two-byte instruction. The value and the segment information are registered in the symbol table 1202. The symbol table 1202 of FIG. 16(G) shows the state after the Label E(11) has been processed. The Label E(11) is a Label defined in the data area visible by the three-byte instruction. The value and the segment information are registered in the symbol table. Thus, the pass-1 processing has been completed.

This time, in the pass-2 processing, the symbol table generating unit 1323 corrects the symbol table 1202 which has been generated in the pass-1 processing and the code estimating unit 1324 estimates a code.

The symbol table 1202 of FIG. 16(H) shows the state after the instructions A(1), B(2), C(3), and D(4) have been processed. Referring to the segment information of the symbol table 1202, the instructions A(1), C(3), and D(4) are visible by the two-byte instruction, while the instruction B(2) is visible by the three-byte instruction. Therefore, the value of the Label A(5) becomes "9H".

The symbol table 1202 of FIG. 16(I) by the symbol table generating unit 1323 of the pass-2 processing shows the state after the instructions E(6) and F(7) have been processed. Referring to the segment information of the symbol table 1202, the instruction E(6) is visible by the two-byte instruction, while the instruction F(7) is visible by the three-byte instruction. Therefore, the value of the Label B(8) becomes "EH". The pass-2 processing has been completed in this way.

In the pass-3 processing, the code generating unit 1333 generates an object module file 1203, on the basis of the information which has been decided through the above pass-1 and pass-2 processings, then to be stored in the symbol table 1202. FIG. 17 is an assembly listing generated by processing the assembler program of FIG. 13.

In the assembly listing of FIG. 17, the generation instructions A(31), B(32), C(33), and D(34) are all generated by the two-byte instruction, so that any useless object code is not generated.

As mentioned above, the conventional assembler device of two-pass method has a defect of generating a useless code (NOP) if the data reference is made prior to the data definition (forward addressing) in case of making access to two memories having different object code length for access.

If the data reference is made after the data definition (backward reference), it has such a defect that the description of the assembler source is restricted, instead of generation of a useless code.

In case of the conventional assembler device of three-pass method, one pass, including one execution of processing through reading the input assembler program from the head to the end by one line, is added to the device of two-pass method, thereby to increase the processing time about 1.4 times longer, which is not practical.

SUMMARY OF THE INVENTION

In order to solve the above problems, an object of the present invention is to provide an efficient assembler device capable of preventing generation of a useless code (NOP) as well as increase in the processing time.

According to one aspect of the invention, an assembler device which generates an object module file by performing assembly processing on an assembler program, comprises a pass-1 processing executing means for executing a pass-1 processing of generating a code optimization table and a code optimization information-attached symbol table including information at least on attribute and appearance frequency of a symbol appearing in the assembler program, and for estimating a code;

a code optimizing means for correcting the code optimization information-attached symbol table generated by the pass-1 processing executing means, with reference to the code optimization table generated by the pass-1 processing executing means; and a pass-2 processing executing means for executing pass-2 processing of converting the assembler program into the object module file with reference to the code optimization information-attached symbol table corrected by the code optimizing means.

In the preferred construction, the code optimizing means executes processing in a memory.

In the preferred construction, the pass-1 processing executing means comprises a character analyzing means for breaking the input assembler program into characters, a syntax analyzing means for recognizing the syntax obtained by analyzing syntax on the basis of the analysis result by the character analyzing means, a symbol table generating means for generating the code optimization information-attached symbol table and the code optimization table on the basis of the analysis result by the syntax analyzing means, and a code estimating means for estimating an object code by the use of the analysis result obtained by the syntax analyzing means and the code optimization information-attached symbol table generated by the symbol table generating means, and wherein the code optimizing means decides the address value of a symbol at such an optimum value as to make the number of codes minimum, on the basis of the code optimization information-attached symbol table and the code optimization table generated by the symbol table generating means.

In another preferred construction, the pass-1 processing executing means comprises a character analyzing means for breaking the input assembler program into characters, a syntax analyzing means for recognizing the syntax obtained by analyzing syntax on the basis of the analysis result by the character analyzing means, a symbol table generating means for generating the code optimization information-attached symbol table and the code optimization table on the basis of the analysis result by the syntax analyzing means, and a code estimating means for estimating an object code by the use of the analysis result obtained by the syntax analyzing means and the code optimization information-attached symbol table generated by the symbol table generating means, and wherein the code optimizing means decides the address value of a symbol at such an optimum value as to make the number of code minimum, through the processing in a memory on the basis of the code optimization information-attached symbol table and the code optimization table generated by the symbol table generating means.

In another preferred construction, the pass-1 processing executing means comprises a character analyzing means for breaking the input assembler program into characters, a syntax analyzing means for recognizing the syntax obtained by analyzing syntax on the basis of the analysis result by the character analyzing means, a symbol table generating means for generating the code optimization information-attached symbol table and the code optimization table on the basis of the analysis result obtained by the syntax analyzing means, and a code estimating means for estimating an object code by the use of the analysis result obtained by the syntax analyzing means and the code optimization information-attached symbol table generated by the symbol table generating means, and wherein the symbol table generating means generates at least the name, value, and segment information of a code and optimization information and registers them in the code optimization information-attached symbol table.

In another preferred construction, the code optimizing means calculates the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, stores the calculated number of the object codes in the area of the arrangement number corresponding to the optimization information in the code optimization information-attached symbol table again, and subtracts the above number of the object codes from the value corresponding to the optimization information in the code optimization information-attached symbol table.

Also, the pass-1 processing executing means comprises a character analyzing means for breaking the input assembler program into characters, a syntax analyzing means for recognizing the syntax obtained by analyzing syntax on the basis of the analysis result by the character analyzing means, a symbol table generating means for generating the code optimization information-attached symbol table and the code optimization table on the basis of the analysis result by the syntax analyzing means, and a code estimating means for estimating an object code by the use of the analysis result obtained by the syntax analyzing means and the code optimization information-attached symbol table generated by the symbol table generating means, and wherein the code optimizing means calculates the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, stores the calculated number of the object codes in the area of the arrangement number corresponding to the optimization information in the code optimization information-attached symbol table again, and subtracts the above number of the object codes from the value corresponding to the optimization information in the code optimization information-attached symbol table.

According to another aspect of the invention, an assembling method of generating an object module file by performing assembly processing on an assembler program, comprises a pass-1 processing executing step for executing pass-1 processing of generating a code optimization table and a code optimization information-attached symbol table including information at least on attribute and appearance frequency of a symbol appearing in the assembler program, and for estimating a code;

a code optimizing step of correcting the code optimization information-attached symbol table generated by the pass-1 processing executing step, with reference to the code optimization table generated by the pass-1 processing executing step; and a pass-2 processing executing step for executing pass-2 processing of converting the assembler program into the object module file with reference to the code optimization information-attached symbol table corrected by the code optimizing step.

In the preferred construction, the pass-1 processing executing step includes breaking the input assembler program into characters, recognizing the syntax obtained by analyzing syntax on the basis of the analysis result by the breaking step, generating the code optimization information-attached symbol table and the code optimization table on the basis of the analysis result by the recognizing step, and estimating an object code by the use of the analysis result obtained by the second step and the code optimization information-attached symbol table generated by the generating step.

In the preferred construction, the pass-1 processing executing step includes breaking the input assembler program into characters, recognizing the syntax obtained by analyzing syntax on the basis of the analysis result by the breaking step, generating the code optimization information-attached symbol table and the code optimization table on the basis of the analysis result by the recognizing step, a fourth step of estimating an object code by the use of the analysis result obtained by the second step and the code optimization information-attached symbol table generated by the generating step, and the step of generating the code optimization information table includes a step of generating at least the name, value, and segment information of a code and registering them in the code optimization information-attached symbol table, and a step of generating the optimization information and registering it in the code optimization information-attached symbol table.

In another preferred construction, the code optimizing step includes calculating the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, storing the calculated number of the object codes in the area of the arrangement number corresponding to the optimization information in the code optimization information-attached symbol table again, and subtracting the above number of the object codes from the value corresponding to the optimization information in the code optimization information-attached symbol table.

According to a further aspect of the invention, a COMPUTER READABLE MEMORY storing a computer program for controlling an assembler device, realized by a computer system, which generates an object module file by performing assembly processing on a assembler program, the computer program comprises executing pass-1 processing of generating a code optimization table and a code optimization information-attached symbol table including information at least on attribute and appearance frequency of a symbol appearing in the assembler program, and for estimating a code, correcting the code optimization information-attached symbol table generated by the pass-1 processing executing step, with reference to the code optimization table generated by the pass-1 processing executing step, and executing pass-2 processing of converting the assembler program into the object module file with reference to the code optimization information-attached symbol table corrected by the code optimizing step.

According to a further aspect of the invention, the the pass-1 processing executing step includes breaking the input assembler program into characters, recognizing the syntax obtained by analyzing syntax on the basis of the analysis result by the breaking step, generating the code optimization information-attached symbol table and the code optimization table on the basis of the analysis result by the recognizing step, and estimating an object code by the use of the analysis result obtained by the second step and the code optimization information-attached symbol table generated by the generating step.

According to a further aspect of the invention, the pass-1 processing executing step includes breaking the input assembler program into characters, recognizing the syntax obtained by analyzing syntax on the basis of the analysis result by the breaking step, generating the code optimization information-attached symbol table and the code optimization table on the basis of the analysis result by the recognizing step, estimating an object code by the use of the analysis result obtained by the second step and the code optimization information-attached symbol table generated by the generating step, and wherein the step of generating the code optimization information table includes a step of generating at least the name, value, and segment information of a code and registering them in the code optimization information-attached symbol table, and a step of generating the optimization information and registering it in the code optimization information-attached symbol table.

In another preferred construction, the code optimizing step includes calculating the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, storing the calculated number of the object codes in the area of the arrangement number corresponding to the optimization information in the code optimization information-attached symbol table again, and subtracting the above number of the object codes from the value corresponding to the optimization information in the code optimization information-attached symbol table.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 8 is a data arrangement view showing the constitution of a code optimization information-attached symbol table of the embodiment.

FIG. 9 is a data arrangement view showing another constitution of a code optimization information-attached symbol table of the embodiment.

FIG. 12 is a data arrangement view showing the constitution of a symbol table in the assembler device of FIG. 11.

FIG. 13 is a view showing an example of an assembler program to be processed.

FIG. 14 is an assembly listing generated by processing the assembler program of FIG. 13 by the use of the assembler device of FIG. 11.

FIG. 16 is a data arrangement view showing the constitution of a symbol table in the assembler device of FIG. 15.

FIG. 17 is an assembly listing generated by processing the assembler program of FIG. 13 by the use of the assembler device of FIG. 15.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
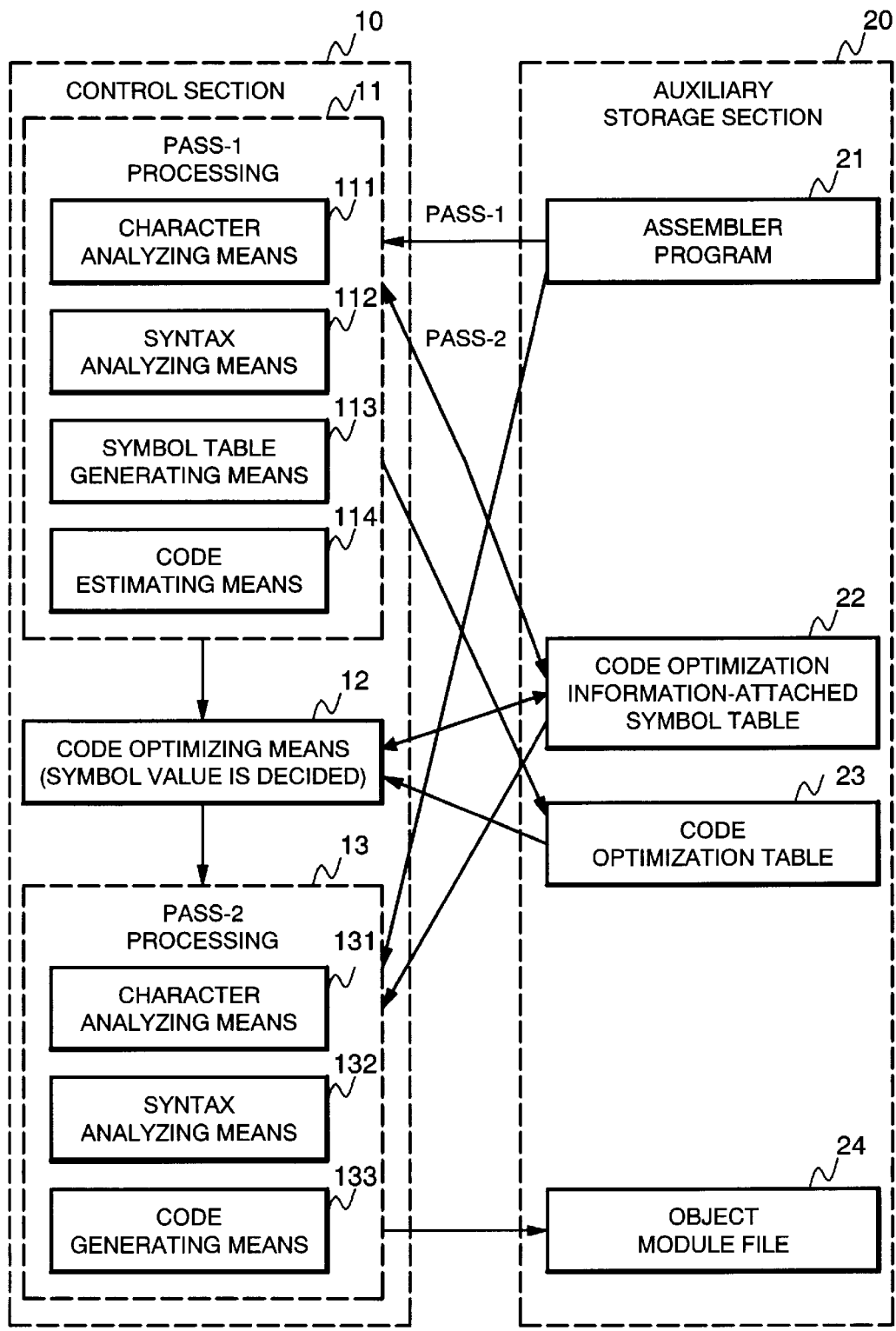
FIG. 1 is a block diagram showing the constitution of an assembler device according to an embodiment of the present invention.

FIG. 1 is a block diagram showing the constitution of an assembler device according to an embodiment of the present invention.

As illustrated in FIG. 1, the assembler device of the embodiment comprises a control section 10 including a pass-1 processing executing unit 11 for executing a pass-1 processing, a code optimizing unit 12, and a pass-2 processing executing unit 13 for executing a pass-2 processing, and an auxiliary storage section 20 for storing an assembler program 21, a symbol table 22 with code optimization information, a table 23 for code optimization, and an object module file 24. The pass-1 processing executing unit 11 of the control section 10 comprises a character analyzing unit 111, a syntax analyzing unit 112, a symbol table generating unit 113, and a code estimating unit 114. The pass-2 processing executing unit 13 comprises a character analyzing unit 131, a syntax analyzing unit 132, and a code generating unit 133.

The assembler device of this embodiment is realized by a computer system such as a work station, a personal computer, or the like. Each unit for executing each function provided in the control section 10 is realized by, for example, a program-controlled CPU and a RAM or the other memory. The auxiliary storage unit 20 is realized by, for example, a magnetic disk or the other storage. The computer program for controlling each unit of the control section 10 is stored in, for example, a magnetic disk or a semiconductor memory, to be provided in the device.

Function of each component will be described. The character analyzing unit 111 breaks the assembler program 21 read from the auxiliary storage section 12 into characters and analyzes them. The syntax analyzing unit 112 builds syntax upon receipt of the analysis result by the character analyzing unit 111 and recognizes the syntax. The symbol table generating unit 113 generates the code optimization information-attached symbol table 22 and the code optimization table 23 upon receipt of the analysis result by the syntax analyzing unit 112. The code estimating unit 114 estimates an object code upon receipt of the analysis result by the syntax analyzing unit 112.

The code optimizing unit 12 corrects symbol values of the code optimization information-attached symbol table 22 in reference to the code optimization table 23 generated in the pass-1 processing.

This time, in the pass-2 processing executing unit 13, the character analyzing unit 131 breaks the assembler program 21 read from the auxiliary storage section 12 into characters and analyzes them. The syntax analyzing unit 132 builds syntax upon receipt of the analysis result by the character analyzing unit 131 and recognizes the syntax. The code generating unit 133 generates an object module file 24 with reference to the code optimization information-attached symbol table 22.

The operation of each unit of this embodiment will be, hereinafter, described with reference to the flow charts of FIGS. 2 to 5.

Figure 2:
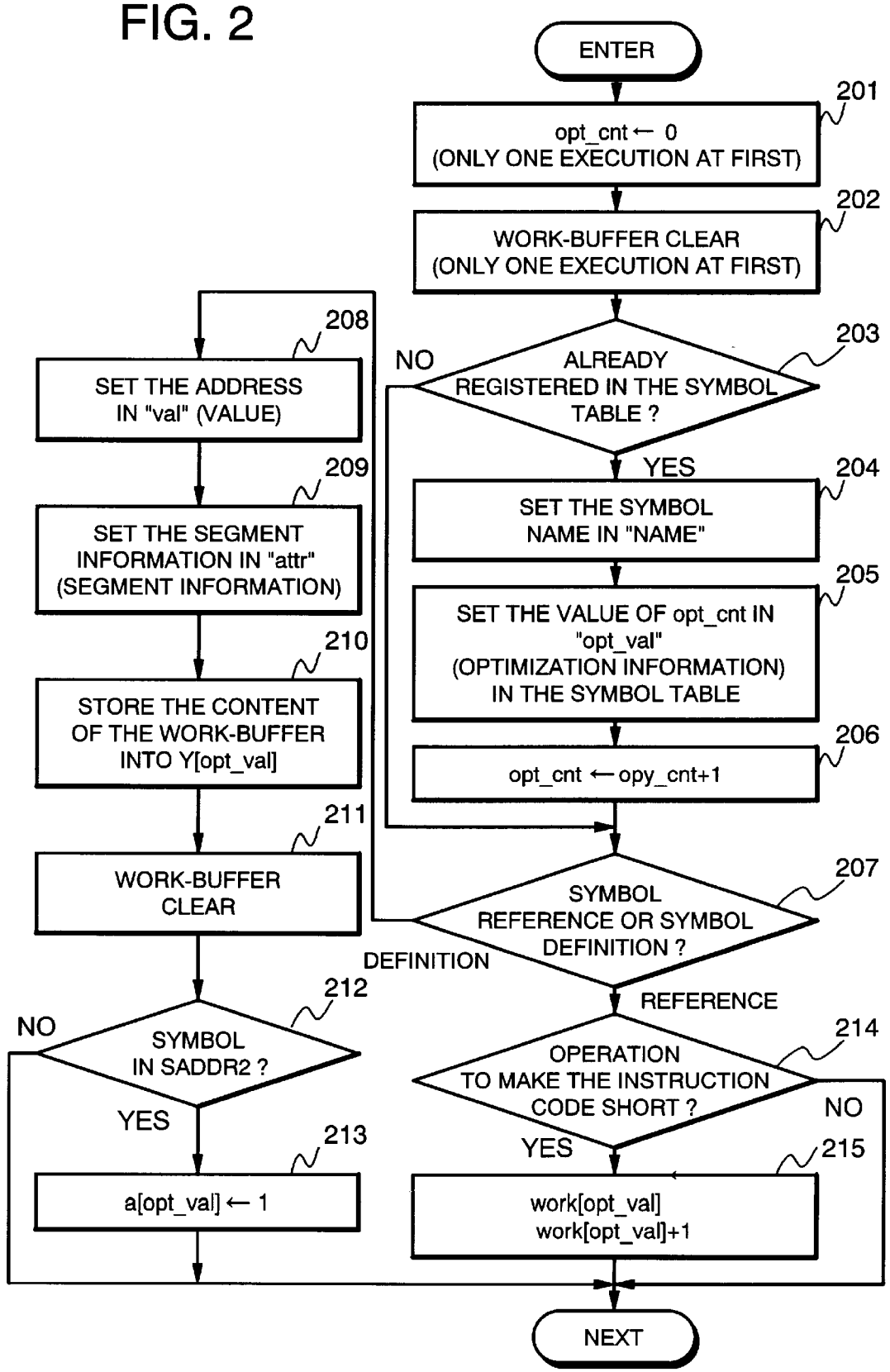
FIG. 2 is a flow chart showing the operation of a symbol table generating unit of this embodiment.

FIG. 2 is a flow chart showing the operation of the symbol table generating unit 113 of the pass-1 executing unit 11. As shown in FIG. 2, a variable opt-cnt for counting optimization information is initialized to "0" in the optimization information counter initialization processing (Step 201). The area "work" for storing the optimization information temporarily is initialized in the work-buffer initialization processing (Step 202). The above initialization processing is to be performed once at first in the pass-1 processing.

In the symbol register judgment processing (Step 203), it is judged whether a symbol in the syntax built by the syntax analyzing unit 112 is registered in the code optimization information-attached symbol table 22. If the symbol has been registered in the code optimization information-attached symbol table 22, the unit goes to the symbol reference judgment processing (Step 207). While, if it has not been registered in the code optimization information-attached symbol table 22, the symbol is registered therein.

Namely, in the symbol name set processing (Step 204), symbol name of the symbol is set in the "name" column of the code optimization information-attached symbol table 22. The value of the variable opt-cnt is set in the "opt-val" column of the code optimization information-attached symbol table 22 in the optimization information set processing (Step 205). The variable opt-cnt is incremented in the optimization information counter increment processing (Step 206). After the above processing, it goes to the symbol reference judgment processing (Step 207).

This time, in the symbol reference judgment processing (Step 207), it is judged whether the symbol is to be referred to or to be defined. If the symbol is judged to be defined, the address of the symbol stored in the variable code is set in the "val" column of the code optimization information-attached symbol table 22, in the symbol value set processing (Step 208). The segment information is set in the "attr" column of the code optimization information-attached symbol table 22 in the segment information set processing (Step 209). The content of the work-buffer is set in the y[opt-val] column, in the y buffer set processing (Step 210). The area "work" for storing the optimization information temporarily is initialized in the work-buffer initialization processing (Step 211).

In the saddr2 symbol judgment processing (Step 212), it is judged whether the symbol is visible by the two-byte instruction or by the three-byte instruction. If the symbol is visible by the two-byte instruction, "1" is registered in the area a[opt-val] storing the information on a symbol visible by the two-byte instruction, in the saddr2 symbol data set processing (Step 213). Thus, the processing of the symbol table generating unit 113 has been completed.

On the other hand, if the symbol is judged to be referred to in the symbol reference judgment processing (Step 207) of FIG. 2, it is judged whether this symbol is an operation that consists of the short instruction code if the symbol can be referred to with the two-byte instruction, in the instruction code judgment processing (Step 214). When it includes such an operation that the instruction code becomes too short, the value of work [opt-val] is incremented (Step 215), then to complete the processing of the symbol table generating unit 113. When it doesn't include such an operation, the processing of the symbol table generating unit 113 will be completed without any processing.

Figure 3:
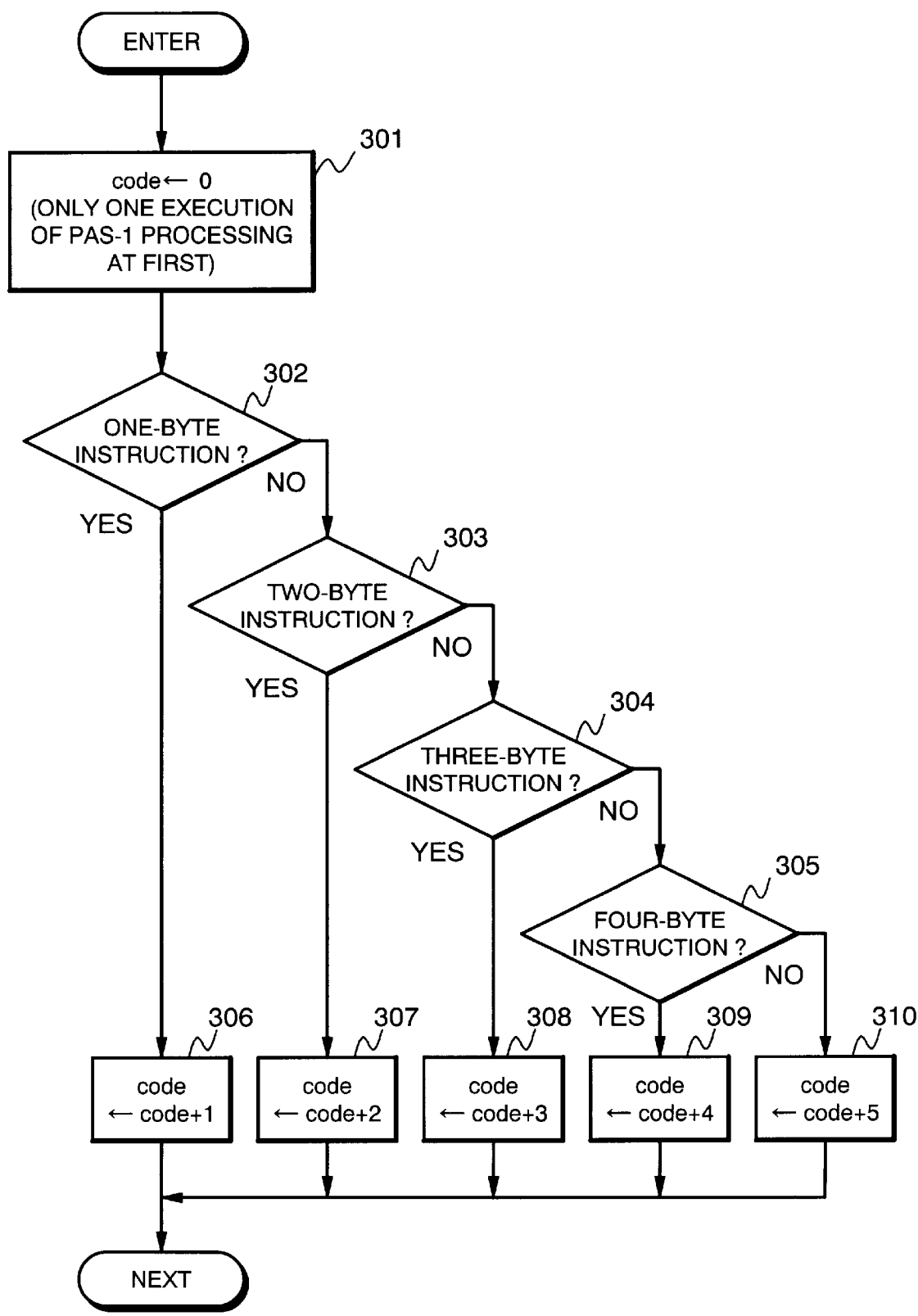
FIG. 3 is a flow chart showing the operation of a code estimating unit of this embodiment.

FIG. 3 is a flow chart showing the operation of the code estimating unit 114. As shown in FIG. 3, a counter for estimating a code is initialized to "0" in the code estimating counter initialization processing (Step 301). This initialization processing is performed once at first in the pass-1 processing.

In the one-byte instruction judgment processing (Step 302), it is judged whether the instruction built by the syntax analyzing unit 112 is a one-byte instruction or not. When it is a one-byte instruction, "1" is added to the counter for estimating a code in the one-byte code estimation processing (Step 306), then to complete the processing of the code estimating unit 114.

When the instruction is not a one-byte instruction, it is judged this time, whether the instruction is a two-byte instruction or not, in the two-byte instruction judgment processing (Step 303). When it is a two-byte instruction, "2" is added to the counter for estimating a code in the two-byte code estimation processing (Step 307), then to complete the processing of the code estimating unit 114.

When the instruction is not a two-byte instruction either, it is judged whether it is a three-byte instruction or not, in the three-byte instruction judgment processing (Step 304). When it is a three-byte instruction, "3" is added to the counter for estimating a code in the three-byte code estimation processing (Step 308), then to complete the processing of the code estimating unit 114.

When the instruction is not a three-byte instruction either, it is judged whether the instruction is a four-byte instruction or not, in the four-byte instruction judgment processing (Step 305). When it is a four-byte instruction, "4" is added to the counter for estimating a code in the four-byte code estimation processing (Step 309), then to complete the processing of the code estimating unit 114. When it is not a four-byte instruction either, "5" is added to the counter for estimating a code in the five-byte code estimation processing (Step 310), then to complete the processing of the code estimating unit 114.

Figure 4:
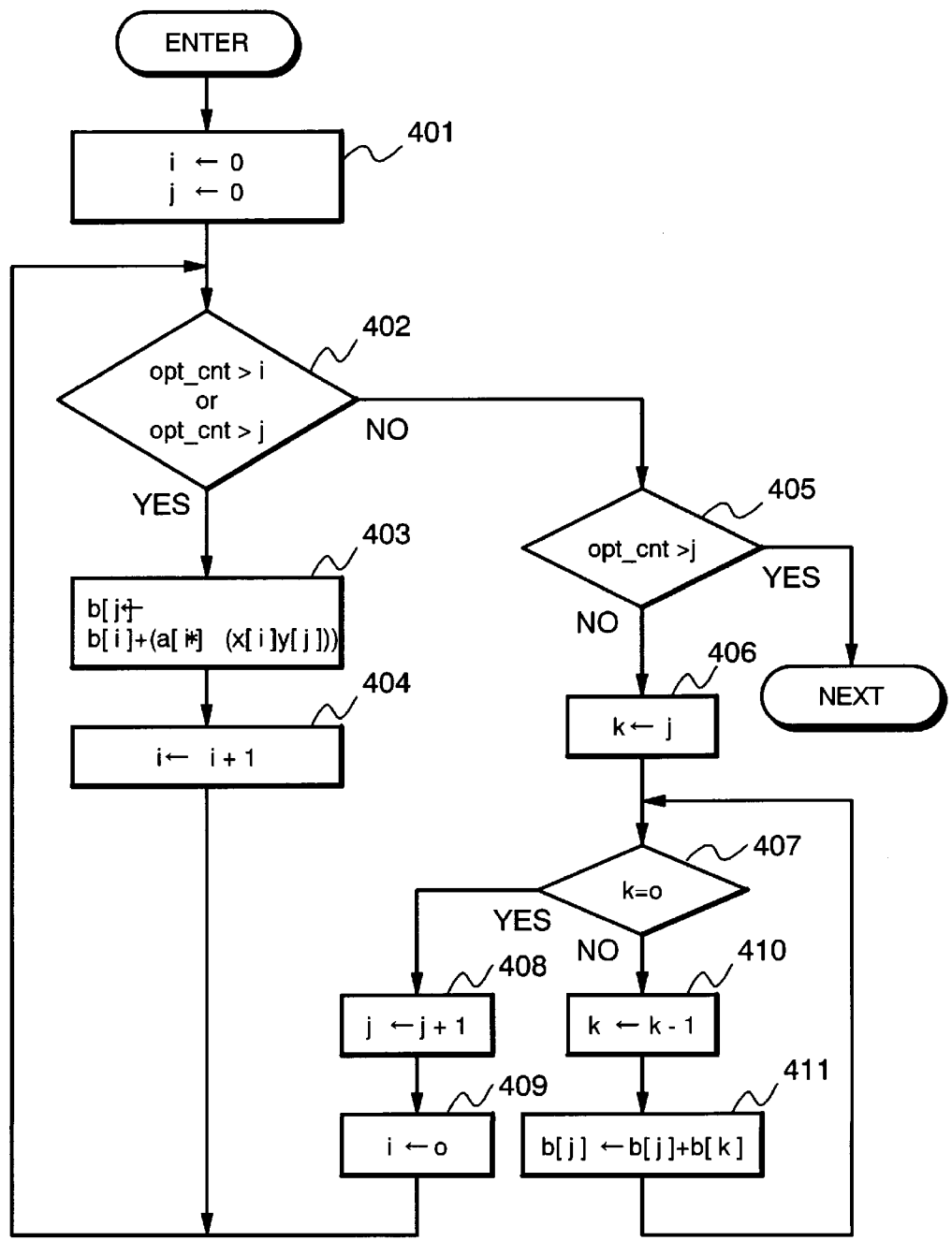
FIG. 4 is a flow chart showing the operation of the first stage by a code optimizing unit of the embodiment.

FIG. 4 is a flow chart showing the operation of the first stage of the code optimizing unit 12. As shown in FIG. 4, an i counter and a j counter showing the position of the area storing the information for correcting the address of the symbol are respectively initialized to "0" at first in the i/j counter initialization processing (Step 401).

The variable opt-cnt storing the total amount of the optimization information is compared with the value of the i counter and the variable opt-cnt is compared with the value of the j counter in the optimization information judgment processing (Step 402). When the value of the i counter is smaller than that of opt-cnt and the value of the j counter is smaller than that of opt-cnt, the value of the area storing the optimization information is multiplied by the value of the area storing the information on a symbol visible by the two-byte instruction in the code shortening calculation processing (Step 403), which result is added to the value of the area storing the information for correcting the address of a symbol. The arithmetic result is stored in the area storing the information for correcting the address of a symbol. The i counter is incremented (Step 404), and then the unit 12 returns to the optimization information judgment processing (Step 402).

While, when the value of the i counter is not smaller than that of opt-cnt, or the value of the j counter is not smaller than that of opt-cnt, the processing of the code optimization unit 12 will be finished, if the value of the j counter is the value of opt-cnt and larger (Step 405). If the value of the j counter is smaller than that of opt-cnt, the value of the j counter is assigned to the k counter indicating the position of the area storing the information for correcting the address of a symbol in the k counter assignment processing (Step 406).

In the k counter judgment processing (Step 407), it is judged whether the value of the k counter is "0" or not. If it is "0", the j counter is incremented (Step 408). The i counter is initialized to "0" in the i counter initialization processing (Step 409) and it returns to the optimization information judgment processing (Step 402).

While, if the value of the k counter is not "0", the k counter is decremented (Step 410). The value, indicated by the j counter, of the area storing the information for correcting the address of a symbol is added to the value, indicated by the k counter, of the area storing the information for correcting the address of a symbol. The addition result is stored in the area storing the information for correcting the address of a symbol, which area is indicated by the j counter. Then, it returns to the k counter judgment processing (Step 407).

Figure 5:
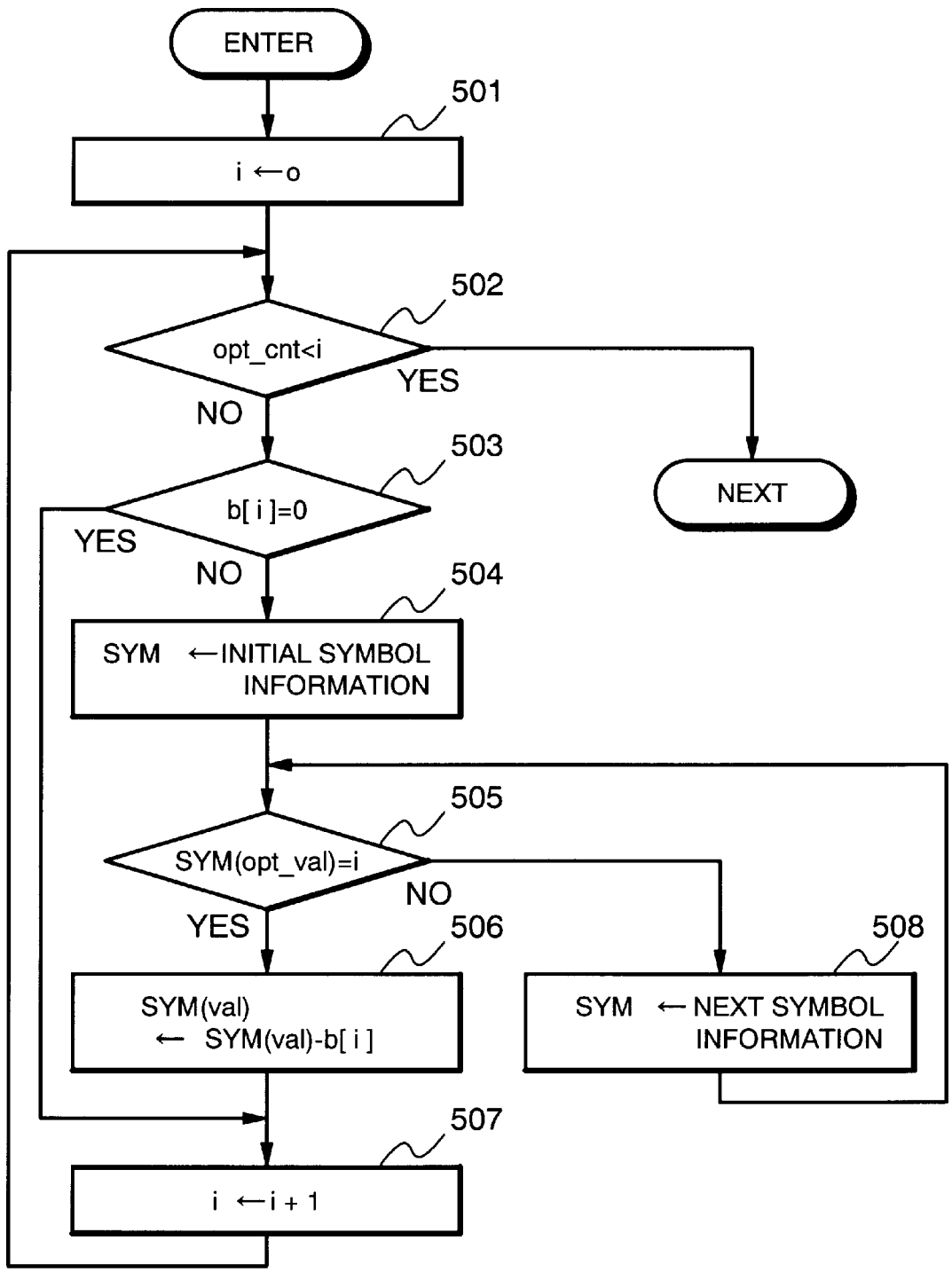
FIG. 5 is a flow chart showing the operation of the second stage by the code optimizing unit of the embodiment.

FIG. 5 is a flow chart showing the operation of the second stage of the code optimizing unit 12. As shown in FIG. 5, the i counter indicating the area storing the information for correcting the address of a symbol is initialized to "0" in the i counter initialization processing (Step 501).

Next, in the optimization information total amount counter judgment processing (Step 502), the value of the variable opt-cnt storing the total amount of the optimization information is compared with the value of the i counter. When the value of the i counter is the value of opt-cnt and larger, the processing of the code optimizing unit 12 will be finished.

On the other hand, when the value of the i counter is smaller than that of opt-cnt, it is judged whether the value of the area b[i] storing the information for correcting symbol address is "0" or not in the code shortening symbol judgment processing (Step 503). If the value of the area b[i] is "0", it goes to the i counter increment processing (Step 507). If the value of the area b[i] is not "0", the initial information on the symbol is stored in the variable SYM in the symbol information fetch processing (Step 504).

This time, in the optimization information judgment processing (Step 505), it is judged whether the value of the optimization information of the symbol information stored in the variable SYM is equal to the value of the i counter. If it is not equal to the value of the i counter, it returns to the optimization information judgment processing (Step 505), after storing the next symbol information into the variable SYM in the symbol information fetch processing (Step 508).

If the value of the optimization information is equal to the value of the i counter, the value of the area b[i] storing the information for correcting the address of a symbol is subtracted from the value of the symbol information stored in the variable SYM, which result is stored into the symbol information value stored in the variable SYM, in the symbol value correction processing (Step 506). The i counter is incremented in the i counter increment processing (Step 507), and it returns to the optimization information total amount counter judgment processing (Step 502).

After the pass processing by the pass-1 processing executing unit 11 and the code optimization processing by the code optimizing unit 12 as mentioned above, an object module file 24 will be generated according to the pass-2 processing by the pass-2 processing executing unit 13.

Figure 6A:
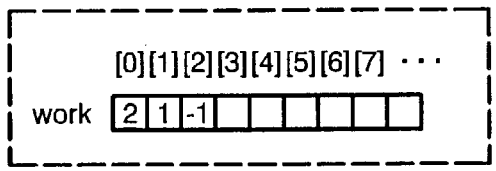
FIG. 6 is a data arrangement view showing the constitution of a code optimization table of the embodiment.
Figure 6B:
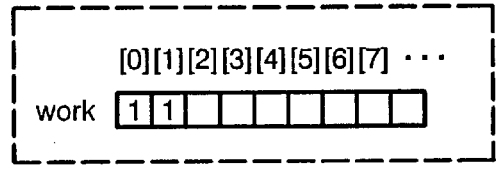
Figure 6C:
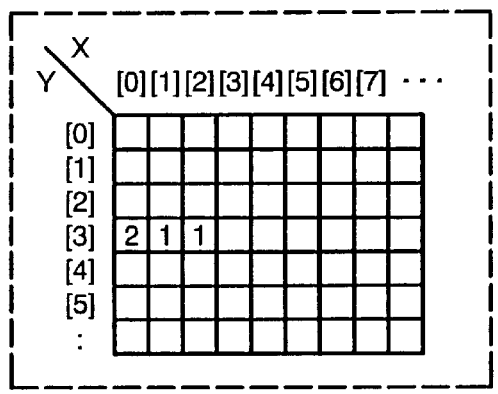
Figure 6D:
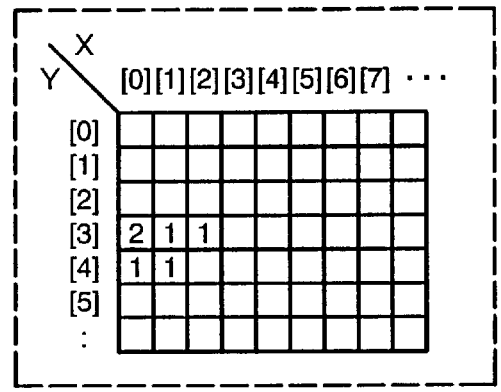
Figure 7A:
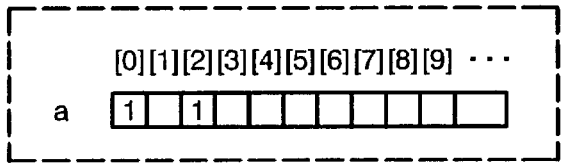
FIG. 7 is a data arrangement view showing the constitution of the code optimization table of the embodiment.
Figure 7B:
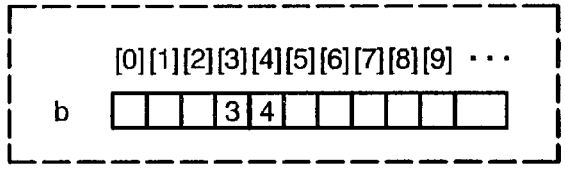

This time, the pass-2 processing will be specifically described referring to the assembler program of FIG. 13 as a candidate for processing. The following example will be described in the case where the assembler program as shown in FIG. 13 is entered, the code shortening instruction information as shown in FIG. 6(D) is generated on the basis of the work-buffer information as shown in FIGS. 6(A) and (B), and further the code shortening symbol information as shown in FIG. 7(A), the optimization information as shown in FIG. 7(B), and the code optimization information-attached symbol table 22 as shown in FIG. 8(E) are respectively generated, thereby to supply the assembly listing.

At first, in the pass-1 processing executing unit 11, the character analyzing unit 111 breaks the assembler program 21 read from the auxiliary storage section 12 into characters and analyzes them. The syntax analyzing unit 112 builds syntax upon receipt of the analysis result from the character analyzing unit 111 and recognizes the instruction A(1) of FIG. 13. The symbol table generating unit 113, the code estimating unit 114 and the code optimizing unit 12 generate the code optimization information-attached symbol table 22. The description will be made below, with reference to the flow charts of FIGS. 2 to 5.

At first, in the symbol table generating unit 113, the variable opt-cnt for counting the optimization information is initialized to "0" in the optimization information counter initialization processing (Step 201). The area "work" for storing the optimization information temporarily is initialized in the work-buffer initialization processing (Step 202). Then, in the symbol register judgment processing (Step 203), it is judged whether a symbol in the syntax built by the syntax analyzing unit 112 has been registered in the code optimization information-attached symbol table 22. Since the "sym1" has not been registered in the code optimization information-attached symbol table 22, it is registered therein.

More specifically, "sym1" is set in the "name" of the code optimization information-attached symbol table 22 in the symbol name set processing (Step 204). The value "0" of the variable opt-cnt is set in the "opt-val" of the code optimization information-attached symbol table 22 in the optimization information set processing (Step 205). The variable opt-cnt is incremented in the optimization information counter increment processing (Step 206). Here, the variable opt-cnt becomes "1".

This time, in the symbol reference judgment processing (Step 207), it is judged whether the symbol is to be referred to or to be defined. Since it is a reference symbol in this case, it is judged whether this instruction includes such an operation that an instruction code becomes too short if the symbol is visible by the two-byte instruction, in the instruction code judgment processing (Step 214). Since this includes such an operation that the instruction code becomes too short, the value of work [opt-val] is incremented (Step 215). At this time, the value of "opt-val" becomes "0" and the value of work[opt-val] becomes "1". The content of the code optimization information-attached symbol table 22 at this point is in accord with the table information A of FIG. 8(A).

Since the counter code for estimating a code has been already initialized at first in the pass-1 processing, by the code estimating unit 114, it is "0H" at this point. In the one-byte instruction judgment processing (Step 302), it is judged whether the instruction A(1) is a one-byte instruction or not. Since the instruction is not a one-byte instruction, it is judged whether the instruction is a two-byte instruction or not, in the two-byte instruction judgment processing (Step 303). Since the instruction is not a two-byte instruction either, it is judged whether it is a three-byte instruction or not, in the three-byte instruction judgment processing (Step 304). Since the instruction is a three-byte instruction, "3H" is added to the counter code for estimating a code in the three-byte code estimation processing (Step 308), so to complete the processing of the code estimating unit 114. The code becomes "3H" here.

Next, the instruction B(2) is recognized through the processing of the character analyzing unit 111 and the syntax analyzing unit 112. Since the "sym2" indicates a symbol reference and no registration in the code optimization information-attached symbol table 22 similarly to the instruction A(1), "sym2" is set in the "name" of the code optimization information-attached symbol table 22. As the result, the value of the variable opt-cnt becomes "2", the value of "opt-val" becomes "1", and the value of work[opt-val] becomes "1". The code estimation is performed by the code estimating unit 114, this time. Since the instruction B(2) is a three-byte instruction similarly to the instruction A(1), the value of the counter code for estimating a code becomes "6H". The content of the code optimization information-attached symbol table 22 is in accord with the table information B of FIG. 8(B), at this point.

Further, the instruction C(3) is recognized through the processing of the character analyzing unit 111 and the syntax analyzing unit 112. Since the "sym1" indicates a symbol reference and has been already registered in the code optimization information-attached symbol table 22, the variable opt-cnt remains "2". The value of "opt-val" becomes "0" and the value of work[opt-val] becomes "2". The code estimation is performed by the code estimating unit 114. Since the instruction C(3) is also a three-byte instruction similarly to the instruction A(1), the value of the counter code for estimating a code becomes "9H". The content of the code optimization information-attached symbol table 22 remains unchanged.

The instruction D(4) is recognized through the processing of the character analyzing unit 111 and the syntax analyzing unit 112. Since the "sym" indicates a symbol reference and no registration in the code optimization information-attached symbol table 22 similarly to the instruction A(1), "sym" is set in the "name" of the code optimization information-attached symbol table 22. The value of opt-cnt becomes "3", the value of "opt-val" becomes "2", and the value of work[opt-val] becomes "1". The code estimation is performed by the code estimating unit 114. Since the instruction D(4) of FIG. 13 is also a three-byte instruction similarly to the instruction A(1), the value of the counter code for estimating a code becomes "CH". The content of the work-buffer is in accord with the work-buffer information of FIG. 6(A). The content of the code optimization information-attached symbol table 22 is in accord with the table information C of FIG. 8(C).

The Label A(5) is recognized through the processing of the character analyzing unit 111 and the syntax analyzing unit 112. The symbol table generating unit 113 makes a judgment whether or not a symbol in the syntax built by the syntax analyzing unit 112 has been registered in the code optimization information-attached symbol table 22 in the symbol register judgment processing (Step 203). Since the "lab" has not been registered in the code optimization information-attached symbol table 22 yet, it is registered in the symbol table 22.

More specifically, "lab" is set in the "name" of the code optimization information-attached symbol table 22 in the symbol name set processing (Step 204). The value "3" of the variable opt-cnt is set in the "opt-val" of the code optimization information-attached symbol table 22 in the optimization information set processing (Step 205). The variable opt-cnt is incremented in the optimization information counter increment processing (Step 206). The value of the variable opt-cnt becomes "4".

This time, it is judged whether the symbol is to be referred to or to be defined, in the symbol reference judgment processing (Step 207). Since it is a symbol definition in this case, the address "CH" of the symbol stored in the variable code is set in the "val" of the code optimization information-attached symbol table 22, in the symbol value set processing (Step 208). The segment information "0" showing CSEG is set in the "attr" of the code optimization information-attached symbol table 22 in the segment information set processing (Step 209). The content of the work-buffer is set in the y[opt-val] in the y buffer set processing (Step 210). The content of the y buffer is in accord with the code shortening instruction information of FIG. 6(C), at this point.

The area "work" for storing the optimization information temporarily is initialized in the work-buffer initialization processing (Step 211). Then, in the saddr2 symbol judgment processing (Step 212), it is judged whether the symbol is visible by the two-byte instruction or by the three-byte instruction. Since the "lab" is the symbol of CSEG, the processing of the symbol table generating unit 113 will be finished without any processing. The content of the code optimization information-attached symbol table 22 is in accord with the table information D of FIG. 8(D).

The instruction E(6) is recognized through the processing of the character analyzing unit 111 and the syntax analyzing unit 112. The "sym1" has been already registered in the code optimization information-attached symbol table 22 and it is a symbol reference. Therefore, as shown in the code optimization information-attached symbol table 22 of FIG. 8(D), the value of "opt-val" on the "sym1" becomes "0" and the value of work[opt-val] becomes "1". The code estimation is performed by the code estimating unit 114. Since the instruction E(6) is a three-byte instruction, the value of the counter code for estimating a code becomes "EH".

The instruction F(7) is recognized through the processing of the character analyzing unit 111 and the syntax analyzing unit 112. The "sym2" has been already registered in the code optimization information-attached symbol table 22 and it is a symbol reference. Therefore, as shown in the code optimization information-attached symbol table 22 of FIG. 8(D), the value of "opt-val" on the "sym2" becomes "1" and the value of work[opt-val] becomes "1". Next, the code estimation is performed by the code estimating unit 114. Since the instruction F(7) is a three-byte instruction, the value of the counter code for estimating a code becomes "12H".

The Label B(8) is recognized through the processing of the character analyzing unit 111 and the syntax analyzing unit 112. The "lab2" has not been registered in the code optimization information-attached symbol table 22 yet and it is a symbol definition. Accordingly, "lab2" is set in the "name" of the code optimization information-attached symbol table 22 in Step 208. The value of the variable opt-cnt becomes "5" and the value of "opt-val" becomes "4". The address "12H" of the symbol stored in the variable code is set in the "val" of the code optimization information-attached symbol table 22 in Step 209. Since the "lab2" is a symbol in CSEG, the segment information "0" showing CSEG is set in the "attr" of the code optimization information-attached symbol table 22. Further, the content of the work-buffer is set in the y[opt-val] in Step 210. Here, the content of the y buffer is in accord with the code shortening instruction information of FIG. 6(D). Next, the area "work" for storing the optimization information temporarily is initialized in the work-buffer initialization processing (Step 211). Here, the content of the code optimization information-attached symbol table 22 is in accord with the table information E of FIG. 8(E).

The Label C(9) is recognized through the processing of the character analyzing unit 111 and the syntax analyzing unit 112. Since the "sym" has been already registered in the code optimization information-attached symbol table 22 and it is a symbol definition, the value of "val" becomes "0H". Since the "sym" pertains to DSEG and it is a symbol in "saddr2", the segment information "1" showing DSEG is set in the "attr" of the code optimization information-attached symbol table 22. It is judged whether it is a symbol in "saddr2" or not, in the saddr2 symbol judgment processing (Step 212). Since the "sym" is a symbol in "saddr2", "1" is set in the a[opt-val] in the saddr2 symbol data set processing (Step 213). The value of "opt-val" on the "sym" is "2".

The Label D(10) is recognized through the processing of the character analyzing unit 111 and the syntax analyzing unit 112. Since the "sym1" has been already registered in the code optimization information-attached symbol table 22 and it is a symbol definition, the value of "val" becomes "2H". Since the "sym1" pertains to DSEG and it is a symbol in "saddr2", the segment information "1" showing DSEG is set in the "attr" of the code optimization information-attached symbol table 22. Further, since the "sym1" is a symbol in "saddr2", "1" is set in the a[opt-val] similarly to the "sym". The value of "opt-val" on the "sym1" is "0. Here, the content of the code optimization information-attached symbol table 22 is in accord with the table information F and the table information G of FIG. 9(A). The content of the a buffer is in accord with the code shortening symbol information of FIG. 8(A).

The Label E(12) is recognized through the processing of the character analyzing unit 111 and the syntax analyzing unit 112. Since the "sym2" has been already registered in the code optimization information-attached symbol table 22, and it is a symbol definition, the value of "val" becomes 0H". Since the "sym2" pertains to DSEG and it is a symbol in "saddr2", the segment information "2" showing DSEG is set in the "attr" of the code optimization information-attached symbol table 22. At this point, the content of the code optimization information-attached symbol table 22 is in accord with the table information H of FIG. 9(B), and the code shortening instruction information of FIG. 6(D) and the code shortening symbol information of FIG. 7(A) are generated. In this way, the pass-i processing by the pass-1 processing executing unit 11 has been completed.

The code optimization processing by the code optimizing unit 12 will be performed this time. At first, the processing of the first stage (refer to FIG. 4) will be performed.

The i counter and j counter showing the position of the area storing the information for correcting the address of a symbol are respectively initialized to "0" in the counter initialization processing (Step 401).

The value of the variable opt-cnt storing the total amount of the optimization information is compared with the value of the i counter and the value of the variable opt-cnt is compared with the value of the j counter in the optimization information judgment processing (Step 402). Since the values of the i counter and the j counter are both "0" and the value of the variable opt-cnt is "5", the value "0" of the area x[0]y[0] storing the optimization information is multiplied by the value "0" of the area a[0] storing the information on the symbol visible by the two-byte instruction, which result is added to the value "0" of the area b[0] storing the information for correcting the address of the symbol, and further the arithmetic result is stored in the area b[0] storing the information for correcting the address of a symbol, in the code shortening calculation processing (Step 403). Here, the value of b[0] becomes "0".

Thereafter, the i counter is incremented (Step 404), and the unit returns to the optimization information judgment processing (Step 402). At this time, the value of the i counter becomes "1". The same processing will be repeated until the value of the i counter becomes "5". Since the values of x[1]y[0] to x[4]y[0] are "0" until the value of the i counter becomes "5", the value stored in b[0] becomes "0".

The value of the variable opt-cnt is compared with that of the i counter and the value of the variable opt-cnt is compared with that of the j counter in the optimization information judgment processing (Step 402). Since the both values of the variable opt-cnt and the i counter are "5", the value of the variable opt-cnt is compared with that of the j counter this time in the optimization information judgment processing (Step 405). Since the value of the variable opt-cnt is "5" and the value of the j counter is "0", the value "0" of the j counter is assigned to the k counter indicating the position of the area storing the information for correcting the address of the symbol in the k counter assignment processing (Step 406).

In the k counter judgment processing (Step 407), it is judged whether the value of the k counter is "0" or not. Since the value of the k counter is "0" in this case, the j counter is incremented (Step 408). Here, the value of the j counter becomes "1". The i counter is initialized to "0" (Step 409), then returning to the optimization information judgment processing (Step 402). The code shortening calculation processing (Step 403) and the i counter increment processing (Step 404) will be repeated until the value of the i counter becomes "5". Since the values of x[0]y[1] to x[4]y[1] are "0" until the value of the i counter becomes "5", the value stored in b[1] becomes "0".

The value of the variable opt-cnt is compared with that of the i counter in the optimization information judgment processing (Step 402). Since the values of the variable opt-cnt and the i counter are both "5", the value of the variable opt-cnt is compared with that of the j counter this time in the optimization information judgment processing (Step 405). Since the value of the variable opt-cnt is "5" and the value of the j counter is "1", the value "1" of the j counter is assigned to the k counter indicating the position of the area storing the information for correcting the address of a symbol in the k counter assignment processing (Step 406).

It is judged whether the value of the k counter is "0" or not, in the k counter judgment processing (Step 407). Since the value of the k counter is "1" here, the k counter is decremented (Step 410). Here, the value of the k counter becomes "0". The value "0" of the area b[1] storing the information for correcting the address of a symbol, indicated by the j counter, is added to the value "0" of the area b[0] storing the information for correcting the address of a symbol, indicated by the k counter, which result is stored in the area b[1] storing the information for correcting the address of a symbol, indicated by the j counter. Here, the value of b[1] becomes "0".

In the k counter judgment processing (Step 407), it is judged whether the value of the k counter is "0" or not. Since the value of the k counter is "0", the j counter is incremented (Step 408). Here, the value of the j counter becomes "2". The i counter is initialized to "0" (Step 409), then returning to the optimization information judgment processing (Step 402). The code shortening calculation processing (Step 403) and the i counter increment processing (Step 404) will be repeated until the value of the i counter becomes "5". Since the values of x[0]y[2] to x[4]y[2] are "0" until the value of the i counter becomes "5", the value stored in b[2] becomes "0".

The value of the variable opt-cnt is compared with the value of the i counter in the optimization information judgment processing (Step 402). Since the values of the variable opt-cnt and the i counter are both "5", it goes to the optimization information judgment processing (Step 405), where (in Step 405) the value of the variable opt-cnt is compared with that of the j counter. Since the value of the variable opt-cnt is "5" and the value of the j counter is "2", it goes to the k counter assignment processing (Step 406), where the value "2" of the j counter is assigned to the k counter indicating the position of the area storing the information for correcting the address of a symbol.

In the k counter judgment processing (Step 407), it is judged whether the value of the k counter is "0" or not. Since the value of the k counter is "2" here, the k counter is decremented (Step 410). Here, the value of the k counter becomes "1". In the code shortening calculation processing (Step 411), the value "0" of the area b[2] storing the information for correcting the address of a symbol indicated by the j counter, is added to the value "0" of the area b[1] storing the information for correcting the address of a symbol indicated by the k counter, which result is stored in the area b[2] storing the information for correcting the address of a symbol, indicated by the j counter. Here, the value of b[2] becomes "0". Then, it is judged whether the value of the k counter is "0" or not, in the k counter judgment processing (Step 407).

Since the value of the k counter is "1", the k counter is decremented (Step 410). Here, the value of the k counter becomes "0". The value "0" of the area b[2] storing the information for correcting the address of a symbol, indicated by the j counter, is added to the value "0" of the area b[0] storing the information for correcting the address of a symbol, indicated by the k counter, which result is stored in the area b[2] storing the information for correcting the address of a symbol, indicated by the j counter. Here, the value of b[2] becomes "0". It returns to the k counter judgment processing (Step 407), where it is judged whether the value of the k counter is "0" or not.

Since the value of the k counter is "0", the j counter is incremented (Step 408). Here, the value of the j counter becomes "3". The i counter is initialized to "0" (Step 409), then returning to the optimization information judgment processing (Step 402), where the value of the variable opt-cnt storing the total amount of the optimization information is compared with the value of the i counter. Since the value of the i counter is "0", the value of the j counter is "3" and the value of the variable opt-cnt is "5", the value "2" of the area x[0]y[3] storing the optimization information is multiplied by the value "1" of the area a[0] storing the information of the symbol visible by the two-byte instruction, which result is added to the value "0" of the area b[3] storing the information for correcting the address of a symbol, and further the addition result is stored in the area b[3] storing the information for correcting the address of a symbol, in the code shortening calculation processing (Step 403). Here, the value of b[3] becomes "2".

Next, the i counter is incremented (Step 404), then returning to the optimization judgment processing (Step 402). Here, the value of the i counter becomes "1". Since the value of the i counter is "1", the value of the j counter is "3", and the value of the variable opt-cnt is "5", the value "1" of the area x[1]y[3] storing the optimization information is multiplied by the value "0" of the area a[1] storing the information on the symbol visible by the two-byte instruction, which result is added to the value "2" of the area b[3] storing the information for correcting the address of a symbol, and further the addition result is stored in the area b[3] storing the information for correcting the address of a symbol, in the code shortening calculation processing (Step 403). Here, the value of b[3] becomes "2".

The i counter is incremented (Step 404), then returning to the optimization information judgment processing (Step 402). Here, the value of the i counter becomes "2". Since the value of the i counter is "2", the value of the j counter is "3", and the value of the variable opt-cnt is "5", the value "1" of the area x[2]y[3] storing the optimization information is multiplied by the value "1" of the area a[2] storing the information on the symbol visible by the two-byte instruction, which result is added to the value "2" of the area b[3] storing the information for correcting the address of a symbol, and further the addition result is stored in the area b[3] storing the information for correcting the address of a symbol, in the code shortening calculation processing (Step 403). Here, the value of b[3] becomes "3". The i counter is incremented (Step 404), then returning to the optimization information judgment processing (Step 402). Here, the value of the i counter becomes "3". Hereinafter, the same processing will be repeated until the value of i counter becomes "5". Since the values of x[3]y[3] to x[4]y[3] are "0" until the value of the i counter becomes "5", the value added to that of b[3] is "0", so that the value of b[3] becomes "3".

The value of the variable opt-cnt is compared with the value of the i counter in the optimization information judgment processing (Step 402). Since the values of the variable opt-cnt and the i counter are both "5", it goes to the optimization information judgment processing (Step 405).

In the optimization information judgment processing (Step 405), the value of the variable opt-cnt is compared with that of the j counter. Since the value of the variable opt-cnt is "5" and the value of the j counter is "3", it goes to the k counter assignment processing (Step 406), where the value "3" of the j counter is assigned to the k counter indicating the position of the area storing the information for correcting the address of a symbol.

It is judged whether the value of the k counter is "0" or not, in the k counter judgment processing (Step 407). Since the value of the k counter is "3", the k counter is decremented (Step 410). Here, the value of the k counter becomes "2". In the code shortening calculation processing (Step 411), the value "3" of the area b[3] storing the information for correcting the address of a symbol, indicated by the j counter, is added to the value "0" of the area b[2] storing the information for correcting the address of a symbol, indicated by the k counter, which result is stored in the area b[9] storing the information for correcting the address of a symbol, indicated by the j counter. Here, the value of b[3] becomes "3".

Then, it is judged whether the value of the k counter is "0" or not, in the k counter judgment processing (Step 407). Since the value of the k counter is "2", the k counter is decremented (Step 410). Here, the value of the k counter becomes "1". In the code shortening calculation processing (Step 411), the value "3" of the area b[3] storing the information for correcting the address of a symbol, indicated by the j counter, is added to the value "0" of the area b[1] storing the information for correcting the address of a symbol, indicated by the k counter, which result is stored in the area b[3] storing the information for correcting the address of a symbol, indicated by the j counter. Here, the value of b[3] becomes "3".

In the k counter judgment processing (Step 407), it is judged whether the value of the k counter is "0" or not. Since the value of the k counter is "1", the k counter is decremented (Step 410). Here, the value of the k counter becomes "0". Then, it goes to the code shortening calculation processing (Step 411). The value "3" of the area b[3] storing the information for correcting the address of a symbol, indicated by the j counter, is added to the value "0" of the area b[0] storing the information for correcting the address of a symbol, indicated by the k counter, which result is stored in the area b[3] storing the information for correcting the address of the symbol, indicated by the j counter, in the code shortening calculation processing (Step 411). Here, the value of b[3] becomes "3".

In the k counter judgment processing (Step 407), it is judged whether the value of the k counter is "0" or not. Since the value of the k counter is "0", the j counter is incremented (Step 408). Here, the value of the j counter becomes "4". The i counter is initialized to "0" (Step 409), then returning to the optimization information judgment processing (Step 402).

The value of the variable opt-cnt storing the total amount of the optimization information is compared with the value of the i counter as well as the value of the j counter respectively, in the optimization information judgment processing (Step 402). Since the value of the i counter is "0", the value of the j counter is "4", and the value of the variable opt-cnt is "5", the value "1" of the area x[0]y[4] storing the optimization information is multiplied by the value "1" of the area a[0] storing the information on the symbol visible by the two-byte instruction, which result is added to the value "0" of the area b[4] storing the information for correcting the address of a symbol, and further the addition result is stored in the area b[4] storing the information for correcting the address of a symbol, in the code shortening calculation processing (Step 403). Here, the value of b[4] becomes "1". The i counter is incremented (Step 404), then returning to the optimization information judgment processing (Step 402). The value of the i counter becomes "1".

The value of the variable opt-cnt storing the total amount of the optimization information is compared with the value of the i counter as well as the value of the j counter respectively, in the optimization information judgment processing (Step 402). Since the value of the i counter is "1", the value of the j counter is "4", and the value of the variable opt-cnt is "5", the value "1" of the area x[1]y[4] storing the optimization information is multiplied by the value "0" of the area a[1] storing the information on the symbol visible by the two-byte instruction, which result is added to the value "1" of the area b[4] storing the information for correcting the address of a symbol. The addition result is stored in the area b[3] storing the information for correcting the address of a symbol, in the code shortening calculation processing (Step 403). Here, the value of b[4] becomes "1". The i counter is incremented (Step 404), then returning to the optimization information judgment processing (Step 402). The value of the i counter becomes "2".

The value of the variable opt-cnt storing the total amount of the optimization information is compared with the value of the i counter as well as the value of the j counter respectively, in the optimization information judgment processing (Step 402). Since the value of the i counter is "2", the value of the j counter is "4", and the value of the variable opt-cnt is "5", the value "0" of the area x[2]y[4] storing the optimization information is multiplied by the value "1" of the area a[2] storing the information on the symbol visible by the two-byte instruction, which result is added to the value "1" of the area b[4] storing the information for correcting the address of a symbol. The addition result is stored in the area b[4] storing the information for correcting the address of a symbol, in the code shortening calculation processing (Step 403). Here, the value of b[4] becomes "1". The i counter is incremented (Step 404), then returning to the optimization information judgment processing (Step 402). The value of the i counter becomes "3". Hereinafter, the same processing will be repeated until the value of i counter becomes "5". Since the values of x[3]y[4] to x[4]y[4] are "0" until the value of the i counter becomes "5", the value added to b[4] is "0", so that the value of b[4] becomes "1".

The value of the variable opt-cnt is compared with the value of the i counter in the optimization information judgment processing (Step 402). Since the values of the variable opt-cnt and the i counter are both "5", it goes to the optimization information judgment processing (Step 405).

When the value of the variable opt-cnt is compared with that of the j counter in the optimization information judgment processing (Step 405), since the value of the variable opt-cnt is "5" and the value of the j counter is "4", it goes to the k counter assignment processing (Step 406), where the value "4" of the j counter is assigned to the k counter indicating the position of the area storing the information for correcting the address of a symbol.

It is judged whether the value of the k counter is "0" or not, in the k counter judgment processing (Step 407). Since the value of the k counter is "4", the k counter is decremented (Step 410). Here, the value of the k counter becomes "8". In the code shortening calculation processing (Step 411), the value "1" of the area b[4] storing the information for correcting the address of a symbol, indicated by the j counter, is added to the value "3" of the area b[3] storing the information for correcting the address of a symbol, indicated by the k counter, which result is stored in the area b[4] storing the information for correcting the address of a symbol, indicated by the j counter. Here, the value of b[4] becomes "4".

Then, it is judged whether the value of the k counter is "0" or not, in the k counter judgment processing (Step 407). Since the value of the k counter is "3", the k counter is decremented (Step 410). Here, the value of the k counter becomes "2". In the code shortening calculation processing (Step 411), the value "4" of the area b[4] storing the information for correcting the address of a symbol, indicated by the j counter, is added to the value "0" of the area b[2] storing the information for correcting the address of a symbol, indicated by the k counter, which result is stored in the area b[4] storing the information for correcting the address of a symbol, indicated by the j counter. Here, the value of b[4] becomes "4".

In the k counter judgment processing (Step 407), it is judged whether the value of the k counter is "0" or not. Since the value of the k counter is "2", the k counter is decremented (Step 410). Here, the value of the k counter becomes "1". Then, in the code shortening calculation processing (Step 411), the value "4" of the area b[4] storing the information for correcting the address of a symbol, indicated by the j counter, is added to the value "0" of the area b[1] storing the information for correcting the address of a symbol, indicated by the k counter, which result is stored in the area b[4] storing the information for correcting the address of a symbol, indicated by the j counter. Here, the value of b[4] becomes "4".

In the k counter judgment processing (Step 407), it is judged whether the value of the k counter is "0" or not. Since the value of the k counter is "2", the k counter is decremented (Step 410). Here, the value of the k counter becomes "0". Then, in the code shortening calculation processing (Step 411), the value "4" of the area b[4] storing the information for correcting the address of a symbol, indicated by the j counter, is added to the value "0" of the area b[0] storing the information for correcting the address of a symbol, indicated by the k counter, which result is stored in the area b[4] storing the information for correcting the address of a symbol, indicated by the j counter. Here, the value of b[4] becomes "4".

In the k counter judgment processing (Step 407), it is judged whether the value of the k counter is "0" or not. Since the value of the k counter is "0", the j counter is incremented (Step 408). The value of the j counter becomes "5". The i counter is initialized to "0" (Step 409), then returning to the optimization information judgment processing (Step 402).

After the i counter initialization processing, the value of the variable opt-cnt storing the total amount of the optimization information is compared with the value of the i counter as well as the value of the j counter respectively, in the optimization information judgment processing (Step 402). Since the value of the i counter is "0", the value of the j counter is "5", and the value of the variable opt-cnt is "5", the value of the variable opt-cnt is compared with the value of the j counter in the optimization information judgment processing (Step 405). Since the value of the variable opt-cnt is "5" and the value of the j counter is "5", the processing of the first stage will be completed, then to proceed to the processing of the second stage (refer to FIG. 5).

At first, the i counter indicating the area storing the information for correcting the address of a symbol is initialized to "0" in the i counter initialization processing (Step 501). In the optimization information total amount counter judgment processing (Step 502), the value of the variable opt-cnt is compared with the value of the i counter. Since the value of the variable opt-cnt is "5" and the value of the i counter is "0", it is judged whether the value of the area b[i] storing the information for correcting the address of a symbol is "0" or not in the code shortening symbol judgment processing (Step 503). Since the value of b[0] is "0", the i counter is incremented (Step 507), then returning to the optimization information total amount counter judgment processing (Step 502). Here, the value of the i counter becomes "1".

In the optimization information total amount counter judgment processing (Step 502), the value of the variable opt-cnt is compared with the value of the i counter. Since the value of the variable opt-cnt is "5" and the value of the i counter is "1", it is judged whether the value of the area b[i] storing the information for correcting the address of a symbol is "0" or not in the code shortening symbol judgment processing (Step 503). Since the value of b[1] is "0", the i counter is incremented (Step 507), then returning to the optimization information total amount counter judgment processing (Step 502). Here, the value of the i counter becomes "2".

In the optimization information total amount counter judgment processing (Step 502), the value of the variable opt-cnt is compared with the value of the i counter. Since the value of the variable opt-cnt is "5" and the value of the i counter is "2", it is judged whether the value of the area b[i] storing the information for correcting the address of a symbol is "0" or not in the code shortening symbol judgment processing (Step 503). Since the value of b[2] is "0", the i counter is incremented (Step 507), returning to the optimization information total amount counter judgment processing (Step 502). Here, the value of the i counter becomes "8".

In the optimization information total amount counter judgment processing (Step 502), the value of the variable opt-cnt is compared with the value of the i counter. Since the value of the variable opt-cnt is "5" and the value of the i counter is "3", it is judged whether the value of the area b[i] storing the information for correcting the address of a symbol is "0" or not in the code shortening symbol judgment processing (Step 503). Since the value of b[3] is "3", it goes to the symbol information fetch processing (Step 504), where the initial symbol information is stored in the variable SYM. The symbol information of "sym1" is stored in the variable SYM.

In the optimization information judgment processing (Step 505), it is judged whether or not the value of the optimization information about the symbol information stored in the variable SYM is equal to that of the i counter. Since the optimization information of "sym1" is "0" and the value of the i counter is "3", it goes to the symbol information fetch processing (Step 508), where the next symbol information is stored in the variable SYM, then returning to the optimization information judgment processing (Step 505). The symbol information of "sym2", is stored in the variable SYM.

In the optimization information judgment processing (Step 505), it is judged whether or not the value of the optimization information about the symbol information stored in the variable SYM is equal to that of the i counter. Since the optimization information of "sym2" is "1" and the value of the i counter is "3", it goes to the symbol information fetch processing (Step 508), where the next symbol information is stored in the variable SYM, then returning to the optimization information judgment processing (Step 505). The symbol information of "sym" is stored in the variable SYM here.

In the optimization information judgment processing (Step 505), it is judged whether or not the value of the optimization information about the symbol information stored in the variable SYM is equal to that of the i counter. Since the optimization information of "sym" is "2" and the value of the i counter is "3", it goes to the symbol information fetch processing (Step 508), where the next symbol information is stored in the variable SYM, then returning to the optimization information judgment processing (Step 505). The symbol information of "lab" is stored in the variable SYM.

In the optimization information judgment processing (Step 505), it is judged whether or not the value of the optimization information about the symbol information stored in the variable SYM is equal to that of the i counter. Since the optimization information of "lab" is "3" and the value of the i counter is "3", the value of the area b[i] storing the information for correcting the address of a symbol is subtracted from the value of the symbol information of "lab" in the symbol value correction processing (Step 506), which result is stored in the value of the symbol information stored in the variable SYM. Since the value of the symbol information of "lab" is "CH" and the value of b[3] is "3", the result "9" of "CH−3" is stored in the value of the symbol information of "lab". The code optimization information-attached symbol table 22 is in accord with the table information I of FIG. 9(C). The i counter is incremented (Step 507), then returning to the optimization information total amount counter judgment processing (Step 502). The value of the i counter becomes "4".

In the optimization information total amount counter judgment processing (Step 502), the value of the variable opt-cnt is compared with the value of the i counter. Since the value of the variable opt-cnt is "5" and the value of the i counter is "4", it is judged whether the value of the area b[i] storing the information for correcting the address of a symbol is "0" or not in the code shortening symbol judgment processing (Step 503). Since the value of b[4] is "4", it goes to the symbol information fetch processing (Step 504), where the initial symbol information is stored in the variable SYM. The symbol information of "sym1" is stored in the variable SYM.

In the optimization information judgment processing (Step 505), it is judged whether or not the value of the optimization information about the symbol information stored in the variable SYM is equal to that of the i counter. Since the optimization information of "sym1" is "0" and the value of the i counter is "4", it goes to the symbol information fetch processing (Step 508), where the next symbol information is stored in the variable SYM, then returning to the optimization information judgment processing (Step 505). The symbol information of "sym2" is stored in the variable SYM.

In the optimization information judgment processing (Step 505), it is judged whether or not the value of the optimization information about the symbol information stored in the variable SYM is equal to that of the i counter. Since the optimization information of "sym2" is "1" and the value of the i counter is "4", it goes to the symbol information fetch processing (Step 508), where the next symbol information is stored in the variable SYM, then returning to the optimization information judgment processing (Step 505). The symbol information of "sym" is stored in the variable SYM.

In the optimization information judgment processing (Step 505), it is judged whether or not the value of the optimization information about the symbol information stored in the variable SYM is equal to that of the i counter. Since the optimization information of "sym1" is "2" and the value of the i counter is "4", it goes to the symbol information fetch processing (Step 508), where the next symbol information is stored in the variable SYM, then returning to the optimization information judgment processing (Step 505). The symbol information of "lab" is stored in the variable SYM.

In the optimization information judgment processing (Step 505), it is judged whether or not the value of the optimization information about the symbol information stored in the variable SYM is equal to that of the i counter. Since the optimization information of "lab" is "3" and the value of the i counter is "4", it goes to the symbol information fetch processing (Step 508), where the next symbol information is stored in the variable SYM, then returning to the optimization information judgment processing (Step 505). The symbol information of "lab2" is stored in the variable SYM.

In the optimization information judgment processing (Step 505), it is judged whether or not the value of the optimization information about the symbol information stored in the variable SYM is equal to that of the i counter. Since the optimization information of "lab2" is "4" and the value of the i counter is "4", the value of the area b[i] storing the information for correcting the address of a symbol is subtracted from the value of the symbol information of "lab2" in the symbol value correction processing (Step 506), which result is stored in the value of the symbol information stored in the variable SYM. Since the value of the symbol information of "lab" is "12H" and the value of b[4] is "4", the result "EH" of "12H−4" is stored in the value of the symbol information of "lab2". The code optimization information-attached symbol table 22 is in accord with the table information J of FIG. 9(D). The i counter is incremented (Step 507), then returning to the optimization information total amount counter judgment processing (Step 502). The value of the i counter becomes "5".

In the optimization information total amount counter judgment processing (Step 502), the value of the variable opt-cnt is compared with the value of the i counter. Since the value of the variable opt-cnt is "5" and the value of the i counter is "5", it is judged whether the value of the area b[i] storing the information for correcting the address of a symbol is "0" or not in the code shortening symbol judgment processing (Step 503). Since the value of b[1] is "0", the i counter is incremented (Step 507), then returning to the optimization information total amount counter judgment processing (Step 502). Here, the value of the i counter becomes "2".

In the optimization information total amount counter judgment processing (Step 502), the value of the variable opt-cnt is compared with the value of the i counter. Since the value of the variable opt-cnt is "5" and the value of the i counter is "6", the processing of the second stage by the code optimizing unit 12 will be completed.

After the above-mentioned processing, the pass-2 processing by the pass-2 processing executing unit 13 will be executed. Namely, the character analyzing unit 131 breaks the assembler program 21 read from the auxiliary storage section 12 into characters and analyzes them. The syntax analyzing unit 132 builds syntax upon receipt of the analysis result by the character analyzing unit 131 and recognizes each instruction. The code generating unit 133 generates an object module file 24 on the basis of the information determined through the processing of the pass-1 processing executing unit 11 and the processing of the code optimizing unit 12. The assembly listing generated by the embodiment is the same as the assembly listing shown in FIG. 17. Accordingly, the generation instructions A(31), B(32), C(33), and D(34) are all generated by the two-byte instruction, so that no useless object code is generated.

Figure 10:
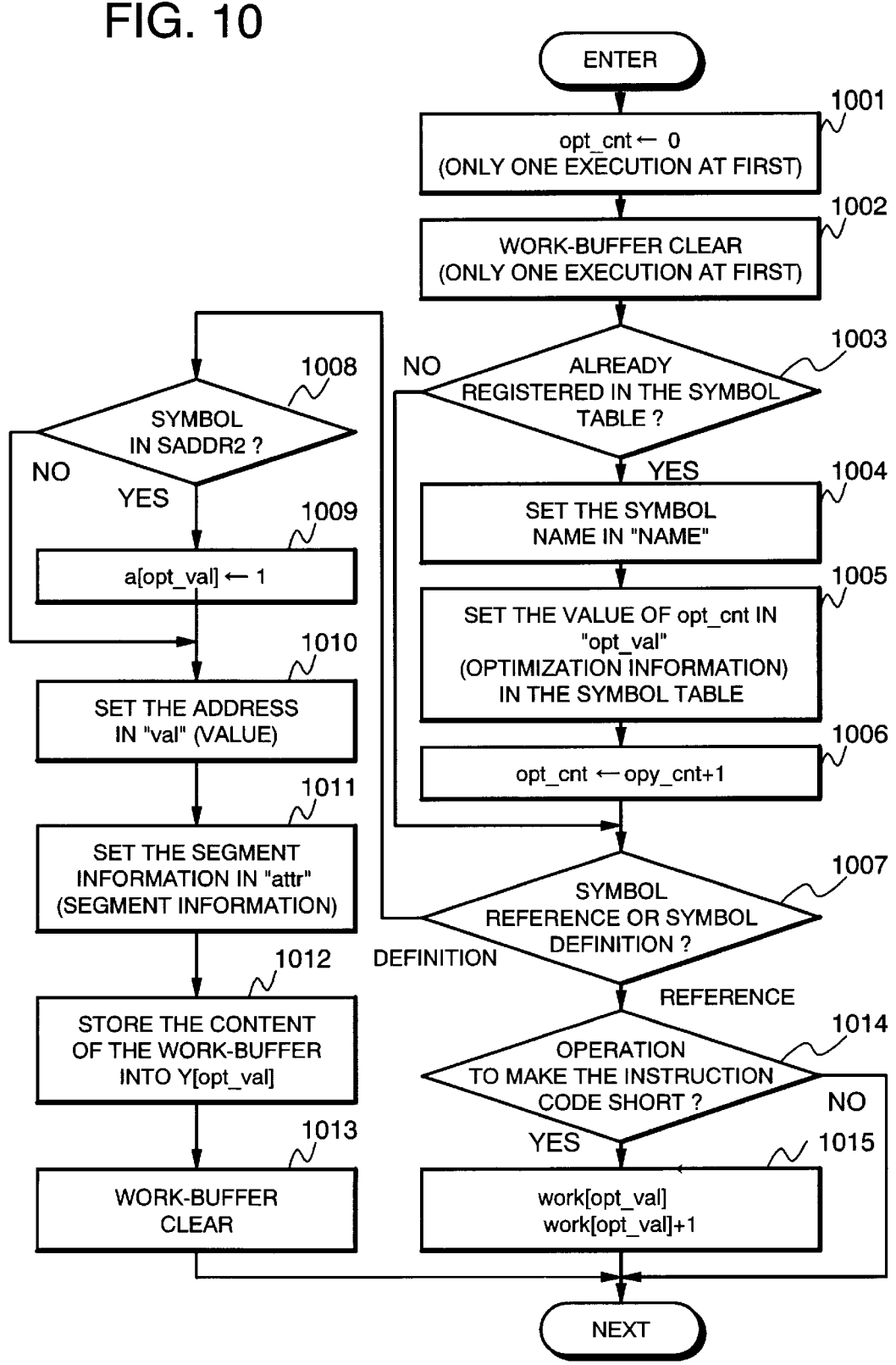
FIG. 10 is a flow chart showing another operation of the symbol table generating unit of the embodiment.
Figure 11:
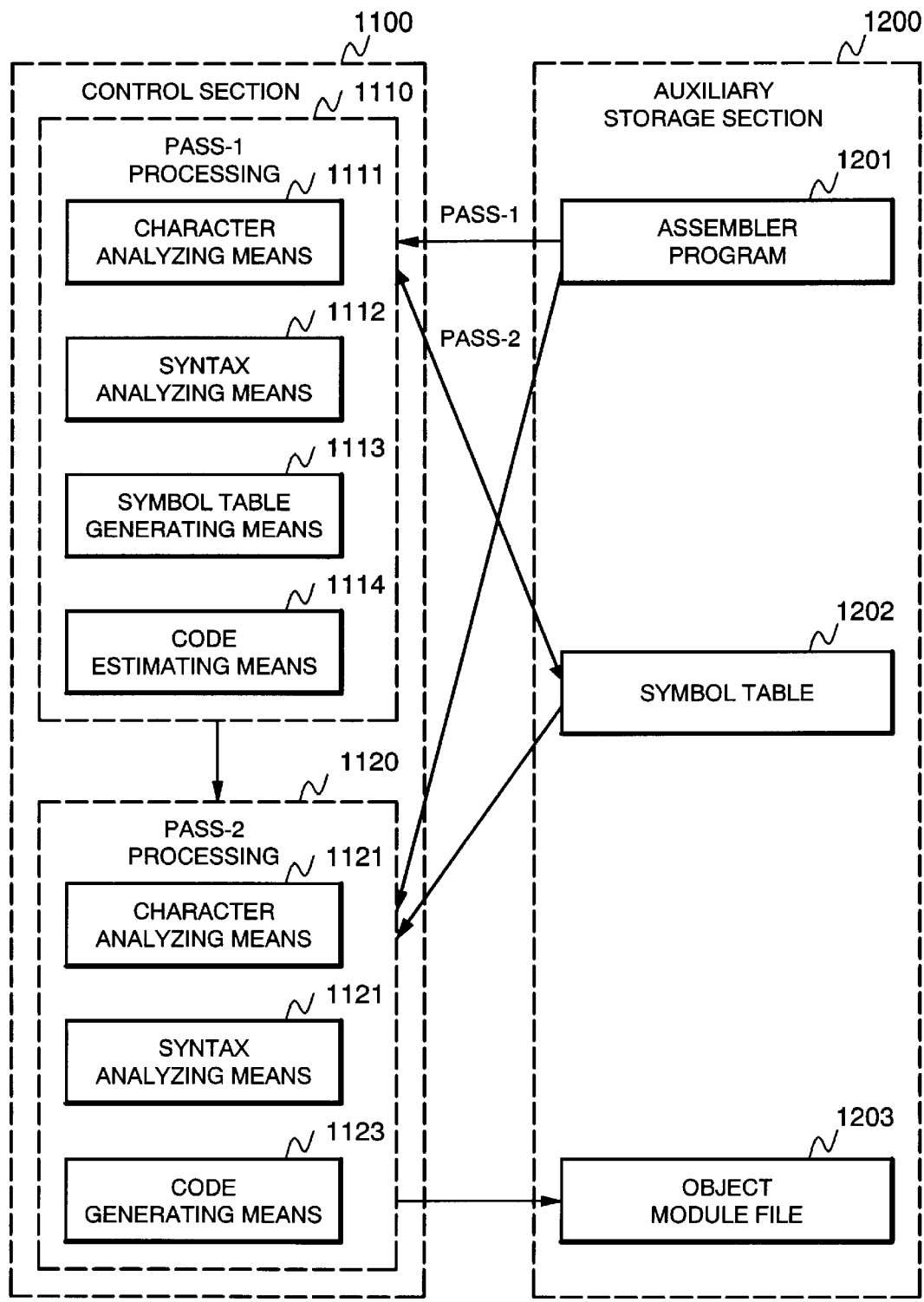
FIG. 11 is a block diagram showing the constitution of the conventional assembler device.
Figure 15:
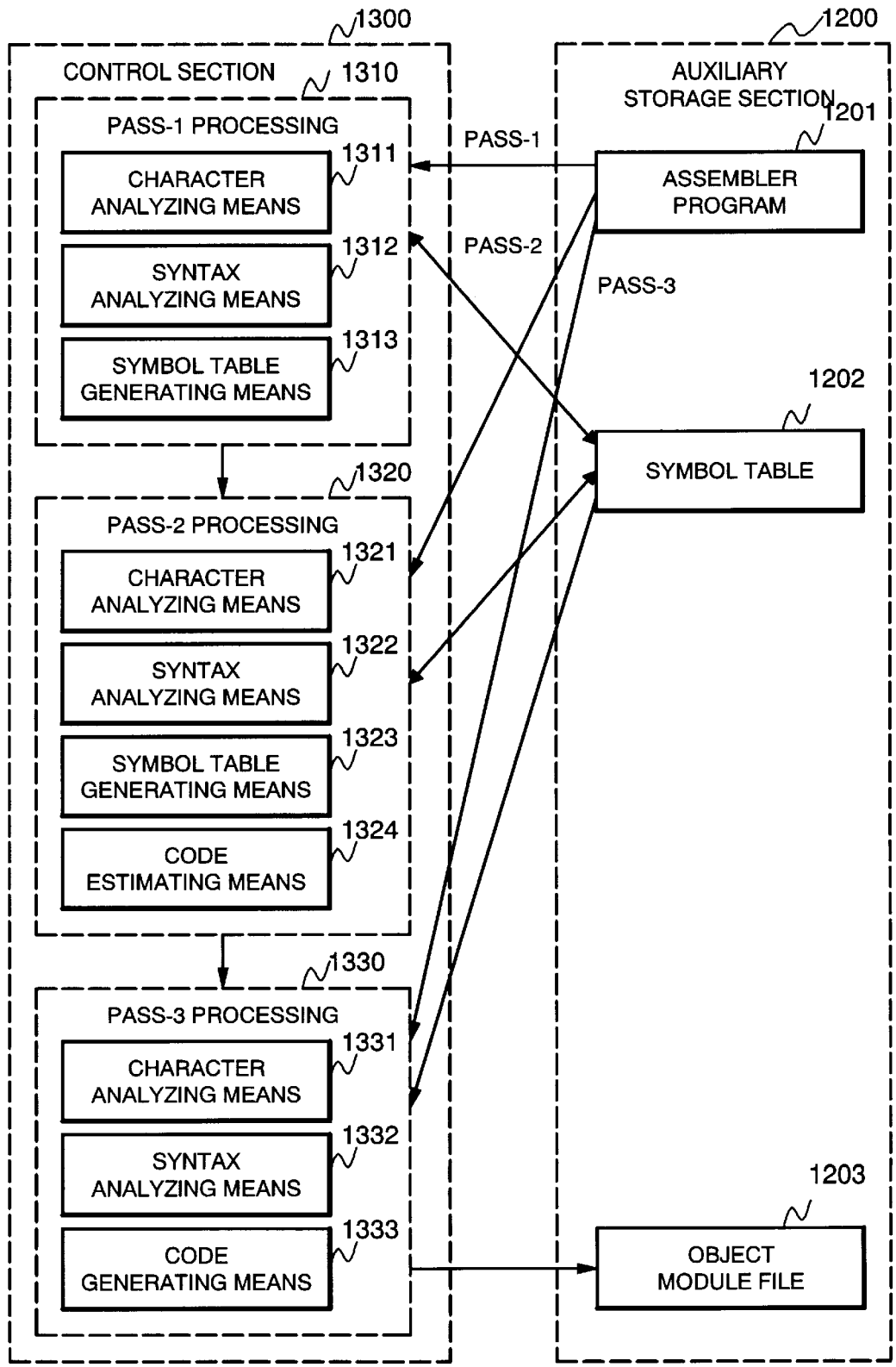
FIG. 15 is a block diagram showing the constitution of another conventional assembler device.

FIG. 10 is a flow chart showing another operation of the symbol table generating unit 113 in the embodiment.

In FIG. 10, the operation from the optimization information counter initialization processing (Step 1001) through the symbol reference judgment processing (Step 1007) is similar to the operation from the optimization information counter initialization processing (Step 201) through the symbol reference judgment processing (Step 207) of the symbol table generating unit 113 shown in FIG. 2. The operation of the instruction code judgment processing (Step 1014) is similar to that of the instruction code judgment processing (Step 214) shown in FIG. 2, and the operation of the symbol reference information set processing (Step 1015) is similar to that of the symbol reference information set processing (Step 215) shown in FIG. 2.

In the operation shown in FIG. 10, it is judged whether the symbol is to be referred to or it is to be defined through the symbol reference judgment processing (Step 1007). When it is a symbol definition, a judgment is made whether the symbol is visible by the two-byte instruction or three-byte instruction in the saddr2 symbol judgment processing (Step 1008). In case of Label A(5) in FIG. 13, since the "lab" is a symbol of CSEG, it goes to the symbol value set processing (Step 1010) directly.

While, in case of Label C(9) in FIG. 13, since the "sym" is a symbol of saddr2, "1" is set in the a[opt-val] in the saddr2 symbol data set processing (Step 1009). Thereafter, it goes to the symbol value set processing (Step 1010).

The operation from the symbol value set processing (Step 1010) to the work-buffer initialization processing (Step 1013) is similar to the operation from the symbol value set processing (Step 208) to the work-buffer initialization processing (Step 211) of the symbol table generating unit 113 shown in FIG. 2. Here, the processing of the symbol table generating unit 113 will be completed.

As set forth hereinabove, according to the assembler device of the present invention, when the assembler program as shown in FIG. 13 is supplied to generate an object module file, an assembly listing as shown in FIG. 17 is generated. Although a useless code (NOP) is generated in the conventional assembler device of two-pass method as shown in the assembly listing of FIG. 14, no useless code (NOP) is generated in the processing of the assembler device of the present invention, as shown in the assembly listing of FIG. 17. Therefore, the object efficiency is improved by 25% or the like in the processing of this assembler program.

In the conventional assembler device of three-pass method, there are three times of passes each including one execution of the processing through reading an input assembler program from the head to the end by one line. On the contrary, in the processing of the assembler device of the present invention, there are two times of passes, each including one execution of the processing through reading the input assembler program from the head to the end by one line, and further the optimization processing is inserted between two pass processings. A large amount of the processing time by the assembler device is to be spent on the operation for reading an input assembler program from the head to the end by one line. In the assembler device of the present invention, however, the optimization processing inserted therebetween is executed in the memory, thereby requiring the processing time little. Namely, even if the optimization processing is performed, the whole processing time is increased by only 1 to 2%. Therefore, the assembler device of the present invention can speed up the processing by about 30% compared with the conventional assembling method of three-pass method. Even if considering the processing time spent on the optimization processing, the whole processing time can be shortened by about 28%.

As set forth hereinabove, in case of access to a plurality of memories, each having different object code length for permitting access, the present invention is capable of executing efficient assembly processing because of no generation of useless code (NOP) and no increase in the assembly processing time, even if performing such a forward addressing that the data reference is performed prior to the data definition.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An assembler device which generates an object module file by performing assembly processing on an assembler program, comprising:

a pass-1 processing executing means for executing a pass-1 processing of generating a code optimization table and a code optimization information-attached symbol table including information at least on attribute and appearance frequency of a symbol appearing in the assembler program, and for estimating a code, wherein said pass-1 processing executing means comprises a character analyzing means for breaking the input assembler program into characters, a syntax analyzing means for recognizing the syntax obtained by analyzing syntax on the basis of the analysis result by said character analyzing means, a symbol table generating means for generating the code optimization information-attached symbol table and the code optimization table on the basis of the analysis result obtained by said syntax analyzing means, and a code estimating means for estimating an object code by the use of the analysis result obtained by said syntax analyzing means and the code optimization information-attached symbol table generated by said symbol table generating means;

a code optimizing means for correcting the code optimization information-attached symbol table generated by said pass-1 processing executing means with reference to the code optimization table generated by said pass-1 processing executing means, wherein said code optimizing means calculates the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, stores the calculated number of the object codes in the area of the arrangement number corresponding to the optimization information in the code optimization information-attached symbol table again, and subtracts the calculated number of the object codes from the value corresponding to the optimization information in the code optimization information-attached symbol table; and a pass-2 processing executing means for executing pass-2 processing of converting the assembler program into the object module file with reference to the code optimization information-attached symbol table corrected by said code optimizing means.

2. An assembler device as set forth in claim 1, wherein said code optimizing means executes processing in a memory.

3. An assembler device as set forth in claim 1, wherein said symbol table generating means generates at least the name, value, and segment information of a code and optimization information and registers them in the code optimization information-attached symbol table.

4. An assembling method of generating an object module file by performing assembly processing on an assembler program, comprising:

a pass-1 processing executing step for executing pass-1 processing of generating a code optimization table and a code optimization information-attached symbol table including information at least on attribute and appearance frequency of a symbol appearing in the assembler program, and for estimating a code, said pass-1 processing executing step including breaking the input assembler program into characters, recognizing the syntax obtained by analyzing syntax on the basis of the analysis result by said breaking step, generating the code optimization information-attached symbol table and the code optimization table on the basis of the analysis result by said recognizing step, and estimating an object code by the use of the analysis result obtained by said recognizing step and the code optimization information-attached symbol table generating by said generating step;

a code optimizing step for correcting the code optimization information-attached symbol table generated by said pass-1 processing executing step, with reference to the code optimization table generated by said pass-1 processing executing step, said code optimizing step including calculating the number of short object codes, by the use of a table with the number of instructions such as making object codes short stored in the area of the arrangement number corresponding to the optimization information in the code optimization information-attached symbol table and a table with the information on a symbol permitting access by the short object code stored into the area of the arrangement number corresponding to the optimization information in the optimization information-attached symbol table, storing the calculated number of the object codes in the area of the arrangement number corresponding to the optimization information in the code optimization information-attached symbol table again, and subtracting the calculated number of the object codes from the value corresponding to the code optimization information-attached symbol table; and a pass-2 processing executing step for executing pass-2 processing of converting the assembler program into the object module file with reference to the code optimization information-attached symbol table corrected by said code optimizing step.

5. An assembling method as set forth in claim 4, wherein said pass-1 processing step executing step wherein said step of generating the code optimization table includes a step of generating at least the name, value, and segment information of a code and registering them in the code optimization information-attached symbol table, and a step of generating the optimization information and registering it in the code optimization information-attached symbol table.

6. A computer readable memory storing a computer program for controlling an assembler device, realized by a computer system, which generates an object module file by performing assembly processing on an assembler program, said computer program comprising:

executing pass-1 processing of generating a code optimization table and a code optimization information-attached symbol table including information at least on attribute and appearance frequency of a symbol appearing in the assembler program, and for estimating a code, said pass-1 processing step including breaking the input assembler program into characters, recognizing the syntax obtained by analyzing syntax on the basis of the analysis result by said breaking step, generating the code optimization information-attached symbol table and the code optimization table on the basis of the analysis result by said recognizing step, and estimating an object code by the use of the analysis result obtained by said second step and the code optimization information-attached symbol table generated by said generating step, correcting the code optimization information-attached symbol table generated by said pass-1 processing executing step, with reference to the code optimization table generated by said pass-1 processing executing step, said correcting step including calculating the number of short object codes, by the use of a table with the number of instructions such as making object codes short stored into the area of the arrangement number corresponding to the optimization information in the code optimization information-attached symbol table and a table with the information on a symbol permitting access by the short object code stored into the area of the arrangement number corresponding to the optimization information in the code optimization information-attached symbol table, storing the calculated number of the object codes in the area of the arrangement number corresponding to the optimization information in the code optimization information-attached symbol table again, and subtracting the calculated number of the object codes from the value corresponding to the optimization information in the code optimization information-attached symbol table, and executing pass-2 processing of converting the assembler program into the object module file with reference to the code optimization information-attached symbol table corrected by said code optimizing step.

7. A computer program stored in a computer readable memory as set forth in claim 6, wherein said step of generating the code optimization table includes a step of generating at least the name, value, and segment information of a code and registering them in the code optimization information-attached symbol table, and a step of generating the optimization information and registering it in the code optimization information-attached symbol table.

* * * * *